US012475863B2

(12) United States Patent
Baek

(10) Patent No.: US 12,475,863 B2
(45) **Date of Patent: *Nov. 18, 2025**

(54) IMAGE DISPLAY APPARATUS

(71) Applicant: LG ELECTRONICS INC., Seoul (KR)

(72) Inventor: Sangwon Baek, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/860,343

(22) PCT Filed: Jun. 7, 2022

(86) PCT No.: PCT/KR2022/008021

§ 371 (c)(1),
(2) Date: Oct. 25, 2024

(87) PCT Pub. No.: WO2023/210863

PCT Pub. Date: Nov. 2, 2023

(65) Prior Publication Data

US 2025/0299646 A1 Sep. 25, 2025

(30) Foreign Application Priority Data

Apr. 27, 2022 (KR) ........................ 10-2022-0052155

(51) Int. Cl.
*G09G 3/36* (2006.01)

(52) U.S. Cl.
CPC ....... *G09G 3/3685* (2013.01); *G09G 2310/08* (2013.01); *G09G 2320/041* (2013.01); *G09G 2330/06* (2013.01); *G09G 2354/00* (2013.01)

(58) Field of Classification Search
None
See application file for complete search history.

(56) References Cited

U.S. PATENT DOCUMENTS

2008/0278473 A1* 11/2008 An ................. H03K 19/018585 327/108
2018/0096650 A1* 4/2018 Pyeon .................. G09G 3/3233
(Continued)

FOREIGN PATENT DOCUMENTS

KR 10-2014-0056615 A 5/2014
KR 10-2018-0062560 A 6/2018
(Continued)

*Primary Examiner* — Krishna P Neupane
(74) *Attorney, Agent, or Firm* — Birch, Stewart, Kolasch & Birch, LLP

(57) ABSTRACT

An image display apparatus is disclosed. The image display device according to an embodiment of the present disclosure includes: a timing controller to output a differential signal; a plurality of data drivers to output a respective data signal based on the differential signal; a panel to output an image based on the respective data signal; and a temperature detector to detect a temperature of or around the panel, wherein the timing controller is configured to: in response to the temperature being a first temperature, output a first differential signal whose level increases based on a first rising slope; and in response to the temperature being a second temperature higher than the first temperature, output a second differential signal whose level increases based on a second rising slope greater than the first rising slope. Accordingly, it is possible to reduce panel noise based on a temperature change and electromagnetic noise.

20 Claims, 17 Drawing Sheets

(56) References Cited

U.S. PATENT DOCUMENTS

| | | | | |
|---|---|---|---|---|
| 2018/0240423 | A1* | 8/2018 | Park | G09G 3/3685 |
| 2020/0234675 | A1* | 7/2020 | Huang | G09G 3/20 |

FOREIGN PATENT DOCUMENTS

| | | | |
|---|---|---|---|
| KR | 10-2020-0074618 | A | 6/2020 |
| KR | 10-2021-0085073 | A | 7/2021 |

* cited by examiner (a)

(b)

IMAGE DISPLAY APPARATUS

CROSS REFERENCE TO RELATED APPLICATIONS

This application is the National Phase of PCT International Application No. PCT/KR2022/008021, filed on Jun. 7, 2022, which claims priority under 35 U.S.C. 119(a) to Patent Application No. 10-2022-0052155, filed in Republic of Korea on Apr. 27, 2022, all of which are hereby expressly incorporated by reference into the present application.

BACKGROUND

1. Field

The present disclosure relates to an image display apparatus, and more particularly, to an image display apparatus capable of reducing panel noise based on a temperature change and reducing electromagnetic noise.

2. Description of the Related Art

An image display apparatus displays images using a panel.

Meanwhile, a panel is driven by a data driver or the like, and the data driver supplies a data signal to the panel based on a signal output from a timing controller.

Recently, as the resolution of a panel increases, the number of data drivers increases, and accordingly, the length of wiring from a timing controller to a data driver increases.

In this case, since the length of wiring between the timing controller and data drivers disposed at opposite end portions of the panel is longer than at a central portion of the panel, when the temperature around the panel increases to a high temperature, noise such as degradation or deterioration is generated at the opposite end portions of the panel upon displaying an image.

Meanwhile, although the level of a signal output from the timing controller is increased to reduce noise at opposite end portions of the panel, electromagnetic noise is generated when the temperature around the panel is room temperature.

SUMMARY

It is an objective of the present disclosure to provide an image display apparatus capable of reducing panel noise based on a temperature change and electromagnetic noise.

It is another objective of the present disclosure to provide an image display apparatus capable of reducing panel noise when the temperature around a panel is a high temperature.

It is yet another objective of the present disclosure to provide an image display apparatus capable of reducing electromagnetic noise when the temperature around a panel is room temperature.

In accordance with an aspect of the present disclosure, the above and other objectives can be accomplished by the provision of an image display apparatus including: a timing controller configured to output a differential signal; a plurality of data drivers configured to output a respective data signal based on the differential signal from the timing controller; a panel configured to output an image based on the respective data signal from the plurality of data drivers; and a temperature detector to detect a temperature of or around the panel, wherein the timing controller is configured to: in response to the temperature detected by the temperature detector being a first temperature, output a first differential signal whose level increases based on a first rising slope; and in response to the temperature detected by the temperature detector being a second temperature higher than the first temperature, output a second differential signal whose level increases based on a second rising slope greater than the first rising slope.

The timing controller may be configured to: in response to the temperature detected by the temperature detector being the first temperature, output the first differential signal whose level increases based on the first rising slope and then maintains a first high level; and in response to the temperature detected by the temperature detector being the second temperature, output the second differential signal whose level increases based on the second rising slope and then maintains the first high level.

The timing controller may be configured to: in response to the temperature detected by the temperature detector being the first temperature, output the first differential signal whose level increases based on the first rising slope and then maintains a first high level; and in response to the temperature detected by the temperature detector being the second temperature, output the second differential signal whose level increases based on the second rising slope and then maintains a second high level higher than the first high level.

The timing controller may be configured to: in response to the temperature detected by the temperature detector being the first temperature, output the first differential signal whose level increases based on a first peak level and the first rising slope; and in response to the temperature detected by the temperature detector being the second temperature, output the second differential signal whose level increases based on a second peak level greater than the first peak level and the second rising slope.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on a second peak level greater than the first peak level and the second rising slope and then maintains the first high level.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential whose level increases based on a second peak level greater than the first peak level and the second rising slope and then maintains a second high level higher than the first high level.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on the first peak level and the second rising slope and then maintains the first high level.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on the first peak level and the second rising slope and then maintains a second high level higher than the first high level.

The timing controller may be configured to: in response to the temperature detected by the temperature detector being the first temperature less than or equal to a first reference temperature, output the first differential signal whose level increases based on a first rising slope; and in response to the temperature detected by the temperature detector being the second temperature greater than or equal to a second reference temperature higher than the first reference temperature, output the second differential signal whose level increases based on a second rising slope greater than the first rising slope.

In response to the temperature detected by the temperature detector being greater than or equal to the second reference temperature, the timing controller may be configured to output the second differential signal having a rising slope which increases as the detected temperature increases.

In response to the temperature detected by the temperature detector being greater than or equal to the second reference temperature, the timing controller may be configured to output the second differential signal having a swing level which increases as the detected temperature increases.

The timing controller may be configured to output a differential signal having a rising slope which increases as the temperature detected by the temperature detector increases.

The timing controller may be configured to output a differential signal having a swing level which increases as the temperature detected by the temperature detector increases.

The plurality of data drivers may be configured to: in response to the temperature detected by the temperature detector being the first temperature, output respective data signals based on the first differential signal having the first rising slope; and in response to the temperature detected by the temperature detector being the second temperature, output respective data signals based on the second differential signal having the second rising slope.

The image display apparatus may further include a signal processing device configured to process an input image signal. The signal processing device and the timing controller may be disposed on a main board, and spaced apart from the plurality of data drivers.

In accordance with another aspect of the present disclosure, there is provided an image display apparatus including: a timing controller configured to output a differential signal; a plurality of data drivers configured to output a respective data signal based on the differential signal from the timing controller; a panel configured to output an image based on the respective data signal from the plurality of data drivers; and a temperature detector to detect a temperature of or around the panel, wherein the timing controller is configured to: in response to the temperature detected by the temperature detector being a first temperature, output a first differential signal whose level increases based on a first peak level; and in response to the temperature detected by the temperature detector being a second temperature, output a second differential signal whose level increases based on a second peak level greater than the first peak level.

The timing controller may be configured to: in response to the temperature detected by the temperature detector being the first temperature, output the first differential signal whose level increases based on the first peak level and then maintains a first high level; and in response to the temperature detected by the temperature detector being the second temperature, output the second differential signal whose level increases based on the first peak level and then maintains the first high level.

The timing controller may be configured to: in response to the temperature detected by the temperature detector being the first temperature, output the first differential signal whose level increases based on the first peak level and then maintains a first high level; and in response to the temperature detected by the temperature detector being the second temperature, output the second differential signal whose level increases based on the first peak level and then maintains a second high level higher than the first high level.

The timing controller may be configured to: in response to the temperature detected by the temperature detector being the first temperature less than or equal to a first reference temperature, output the first differential signal whose level increases based on the first peak level; and in response to the temperature detected by the temperature detector being the second temperature greater than or equal to a second reference temperature higher than the first reference temperature, output the second differential signal whose level increases according to the second peak level.

The timing controller may be configured to output a differential signal having a peak level which increases as the temperature detected by the temperature detector increases.

Effects of the Disclosure

An image display apparatus according to an embodiment of the present disclosure includes: a timing controller configured to output a differential signal; a plurality of data drivers configured to output a respective data signal based on the differential signal from the timing controller; a panel configured to output an image based on the respective data signal from the plurality of data drivers; and a temperature detector to detect a temperature of or around the panel, wherein the timing controller is configured to: in response to the temperature detected by the temperature detector being a first temperature, output a first differential signal whose level increases based on a first rising slope; and in response to the temperature detected by the temperature detector being a second temperature higher than the first temperature, output a second differential signal whose level increases based on a second rising slope greater than the first rising slope. Accordingly, it is possible to reduce panel noise based on a temperature change and electromagnetic noise. In particular, it is possible to reduce panel noise when the temperature around the panel is a high temperature. In addition, it is possible to reduce electromagnetic noise when the temperature around the panel is room temperature.

The timing controller may be configured to: in response to the temperature detected by the temperature detector being the first temperature, output the first differential signal whose level increases based on the first rising slope and then maintains a first high level; and in response to the temperature detected by the temperature detector being the second temperature, output the second differential signal whose level increases based on the second rising slope and then maintains the first high level. Accordingly, it is possible to reduce panel noise based on a temperature change and electromagnetic noise.

The timing controller may be configured to: in response to the temperature detected by the temperature detector being the first temperature, output the first differential signal whose level increases based on the first rising slope and then maintains a first high level; and in response to the temperature detected by the temperature detector being the second temperature, output the second differential signal whose level increases based on the second rising slope and then maintains a second high level higher than the first high level. Accordingly, it is possible to reduce panel noise based on a temperature change and electromagnetic noise.

The timing controller may be configured to: in response to the temperature detected by the temperature detector being the first temperature, output the first differential signal whose level increases based on a first peak level and the first rising slope; and in response to the temperature detected by the temperature detector being the second temperature, output the second differential signal whose level increases based on a second peak level greater than the first peak level and the second rising slope. Accordingly, it is possible to reduce panel noise based on a temperature change and electromagnetic noise.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on a second peak level greater than the first peak level and the second rising slope and then maintains the first high level. Accordingly, it is possible to reduce panel noise based on a temperature change and electromagnetic noise.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential whose level increases based on a second peak level greater than the first peak level and the second rising slope and then maintains a second high level higher than the first high level. Accordingly, it is possible to reduce panel noise based on a temperature change and electromagnetic noise.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on the first peak level and the second rising slope and then maintains the first high level. Accordingly, it is possible to reduce panel noise based on a temperature change and electromagnetic noise.

The timing controller may be configured to: in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on the first peak level and the second rising slope and then maintains a second high level higher than the first high level. Accordingly, it is possible to reduce panel noise based on a temperature change and electromagnetic noise.

The timing controller may be configured to: in response to the temperature detected by the temperature detector being the first temperature less than or equal to a first reference temperature, output the first differential signal whose level increases based on a first rising slope; and in response to the temperature detected by the temperature detector being the second temperature greater than or equal to a second reference temperature higher than the first reference temperature, output the second differential signal whose level increases based on a second rising slope greater than the first rising slope. Accordingly, it is possible to reduce panel noise based on a temperature change and electromagnetic noise.

In response to the temperature detected by the temperature detector being greater than or equal to the second reference temperature, the timing controller may be configured to output the second differential signal having a rising slope which increases as the detected temperature increases. Accordingly, it is possible to reduce panel noise based on a temperature change and electromagnetic noise.

In response to the temperature detected by the temperature detector being greater than or equal to the second reference temperature, the timing controller may be configured to output the second differential signal having a swing level which increases as the detected temperature increases. Accordingly, it is possible to reduce panel noise based on a temperature change and electromagnetic noise.

The timing controller may be configured to output a differential signal having a rising slope which increases as the temperature detected by the temperature detector increases. Accordingly, it is possible to reduce panel noise based on a temperature change and electromagnetic noise.

The timing controller may be configured to output a differential signal having a swing level which increases as the temperature detected by the temperature detector increases. Accordingly, it is possible to reduce panel noise based on a temperature change and electromagnetic noise.

The plurality of data drivers may be configured to: in response to the temperature detected by the temperature detector being the first temperature, output respective data signals based on the first differential signal having the first rising slope; and in response to the temperature detected by the temperature detector being the second temperature, output respective data signals based on the second differential signal having the second rising slope. Accordingly, it is possible to reduce panel noise based on a temperature change and electromagnetic noise.

The image display apparatus may further include a signal processing device configured to process an input image signal. The signal processing device and the timing controller may be disposed on a main board, and spaced apart from the plurality of data drivers. Accordingly, it is possible to reduce panel noise based on a temperature change and electromagnetic noise.

An image display apparatus according to another embodiment of the present disclosure includes: a timing controller configured to output a differential signal; a plurality of data drivers configured to output a respective data signal based on the differential signal from the timing controller; a panel configured to output an image based on the respective data signal from the plurality of data drivers; and a temperature detector to detect a temperature of or around the panel, wherein the timing controller is configured to: in response to the temperature detected by the temperature detector being a first temperature, output a first differential signal whose level increases based on a first peak level; and in response to the temperature detected by the temperature detector being a second temperature, output a second differential signal whose level increases based on a second peak level greater than the first peak level. Accordingly, it is possible to reduce panel noise based on a temperature change and electromagnetic noise. In particular, it is possible to reduce panel noise when the temperature around the panel is a high temperature. In addition, it is possible to reduce electromagnetic noise when the temperature around the panel is room temperature.

The timing controller may be configured to: in response to the temperature detected by the temperature detector being the first temperature, output the first differential signal whose level increases based on the first peak level and then maintains a first high level; and in response to the temperature detected by the temperature detector being the second temperature, output the second differential signal whose level increases based on the first peak level and then maintains the first high level. Accordingly, it is possible to reduce panel noise based on a temperature change and electromagnetic noise.

The timing controller may be configured to: in response to the temperature detected by the temperature detector being the first temperature, output the first differential signal whose level increases based on the first peak level and then maintains a first high level; and in response to the temperature detected by the temperature detector being the second temperature, output the second differential signal whose level increases based on the first peak level and then maintains a second high level higher than the first high level. Accordingly, it is possible to reduce panel noise based on a temperature change and electromagnetic noise.

The timing controller may be configured to: in response to the temperature detected by the temperature detector being the first temperature less than or equal to a first reference temperature, output the first differential signal whose level increases based on the first peak level; and in response to the temperature detected by the temperature detector being the second temperature greater than or equal to a second reference temperature higher than the first reference temperature, output the second differential signal whose level increases according to the second peak level. Accordingly, it is possible to reduce panel noise based on a temperature change and electromagnetic noise.

The timing controller may be configured to output a differential signal having a peak level which increases as the temperature detected by the temperature detector increases. Accordingly, it is possible to reduce panel noise based on a temperature change and electromagnetic noise.

DETAILED DESCRIPTION OF THE PREFERRED EMBODIMENTS

Reference will now be made in detail to the preferred embodiments of the present disclosure, examples of which are illustrated in the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
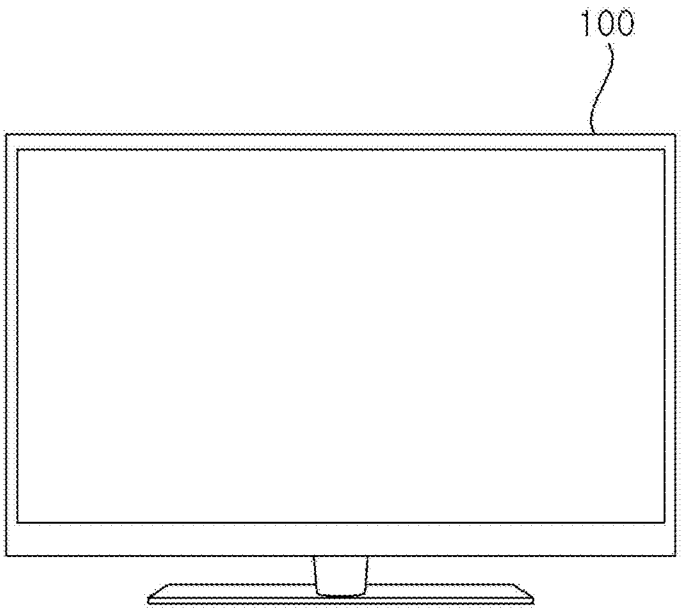
FIG. 1 illustrates an outer appearance of an image display apparatus according to an embodiment of the present disclosure.

FIG. 1 illustrates an outer appearance of an image display apparatus according to an embodiment of the present disclosure.

Referring to FIG. 1, an image display apparatus 100 according to an embodiment of the present disclosure may include a display (180 shown in FIG. 2), a signal processing device (170 shown in FIG. 2) for performing a control operation to display images on the display, and a power supply (190 shown in FIG. 2) for supplying power to the display.

When the display 180 includes a liquid crystal panel, a separate light source, such as an LED or the like, is used.

Meanwhile, as resolution of the image display apparatus 100 increases to high definition (HD), full HD, ultra-high definition (UHD), 4K, 8K, and beyond, the number of light sources increases.

As the number of light sources increases, the number of data drivers and gate drivers for driving the light sources increases as well. In particular, the length of wiring from a timing controller to a data driver increases.

When the length of wiring from the timing controller to the data driver increases, it is more susceptible to panel noise.

Therefore, an embodiment of the present disclosure provides a method capable of reducing panel noise based on a temperature change and reducing electromagnetic noise.

To this end, the image display apparatus 100 according to the embodiment of the present disclosure includes a timing controller 232 (see FIG. 10) configured to output a differential signal Sim, a plurality of data drivers DD1 to DD12 (see FIG. 10) configured to output a respective data signal based on the differential signal Sim from the timing controller 232, a panel 210 (see FIG. 10) configured to display an image based on the respective data signal from the plurality of data drivers DD1 to DD12, and a temperature detector TD (see FIG. 10) configured to detect a temperature of or around the panel 210. The timing controller 232 outputs a first differential signal Simaa whose level increases based on a first rising slope SLa when the temperature detected by the temperature detector TD being a first temperature, and outputs a second differential signal Simab whose level increases based on a second rising slope SLb greater than the first rising slope SLa when the temperature detected by the temperature detector TD being a second temperature higher than the first temperature.

Thus, it is possible to reduce panel noise based on a temperature change and electromagnetic noise. In particular, it is possible to reduce panel noise when the temperature around the panel 210 is a high temperature. In addition, it is possible to reduce electromagnetic noise when the temperature around the panel 210 is room temperature. This will be described in more detail with reference to FIG. 10 and the sequent figures.

Figure 2:
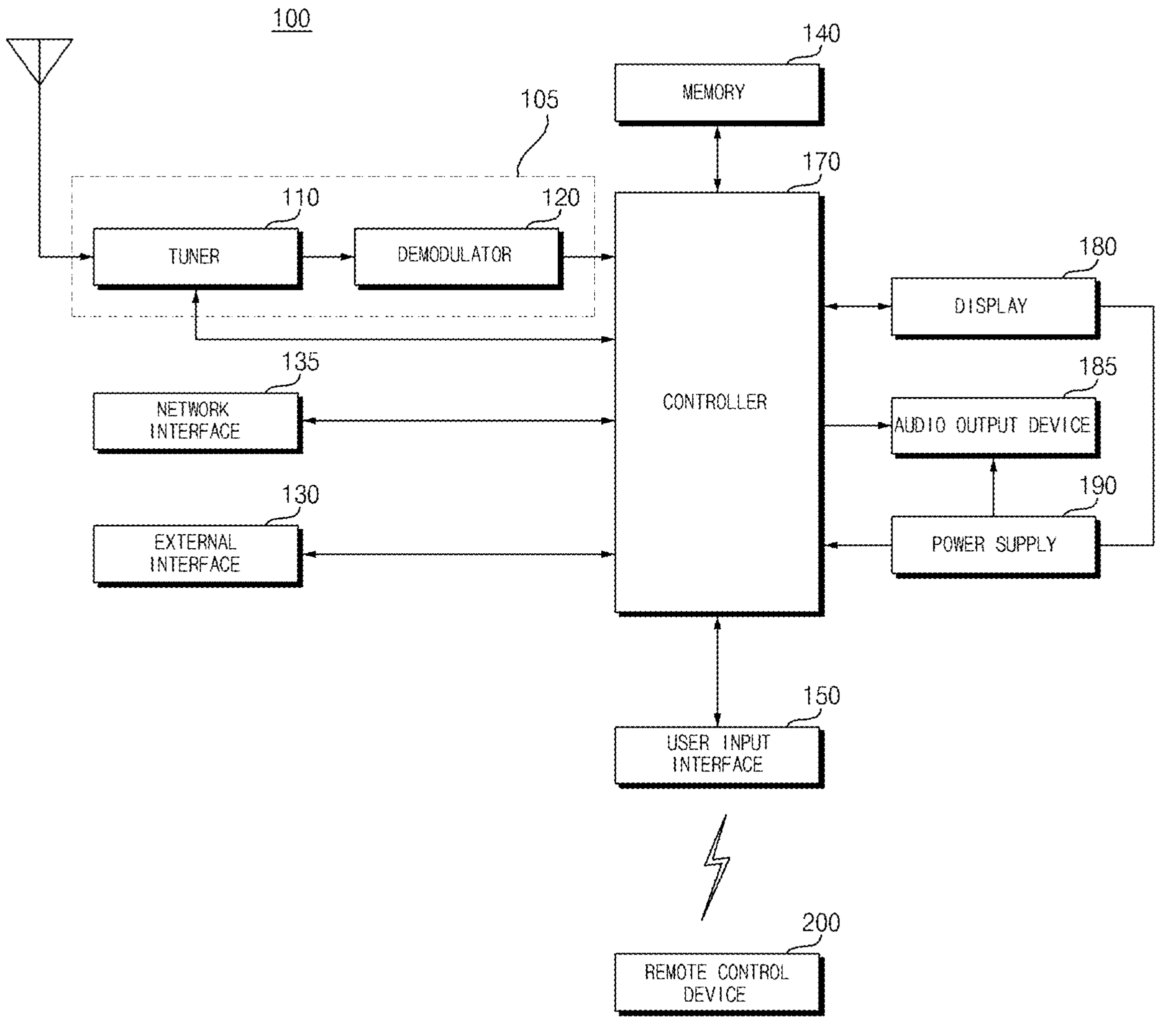
FIG. 2 is an internal block diagram of the image display apparatus of FIG. 1.

FIG. 2 is an internal block diagram of the image display apparatus of FIG. 1.

Referring to FIG. 2, the image display apparatus 100 according to an embodiment of the present disclosure may include a broadcast receiver 105, an external device interface 130, a memory 140, a user input interface 150, a sensor device (not shown), a signal processing device 170, a display 180, and an audio output device 185.

The broadcast receiver 105 may include a tuner 110, a demodulator 120, and a network interface 135. As needed, the broadcast receiver 105 may be designed not to include the network interface 135 while including the tuner 110 and the demodulator 120. Conversely, the broadcast receiver 105 may include only the network interface 135 and does not include the tuner 110 and the demodulator 120.

Unlike FIG. 2, the broadcast receiver 105 may include the external device interface 130. For example, a broadcast signal generated by a set-top box (not shown) may be received through the external device interface 130.

The tuner 110 selects a radio frequency (RF) broadcast signal corresponding to a channel selected by a user or all prestored channels from among RF broadcast signals received through an antenna. In addition, the tuner 110 converts the selected RF broadcast signal into an intermediate frequency (IF) signal, a baseband image or audio signal.

For example, if the selected RF broadcast signal is a digital broadcast signal, the tuner 110 converts the digital broadcast signal into a digital intermediate frequency (DIF) signal. If the selected RF broadcast signal is an analog broadcast signal, the tuner 110 converts the analog broadcast signal into an analog baseband image or audio signal (composite video baseband signal (CVBS)/sound IF (SIF)). That is, the tuner 110 may process a digital broadcast signal or an analog broadcast signal. The analog baseband image or audio signal (CVBS/SIF) output from the tuner 110 may be directly input to the signal processing device 170.

The tuner 110 may sequentially select RF broadcast signals for all broadcast channels stored through a channel memorization function from among RF broadcast signals received through the antenna and convert the same into an IF signal, a baseband image or audio signal.

To receive broadcast signals of a plurality of channels, a plurality of tuners 110 may be provided. Alternatively, a single tuner to receive broadcast signals of a plurality of channels simultaneously may be provided.

The demodulator 120 receives and demodulates the DIF signal converted by the tuner 110.

After performing demodulation and channel decoding, the demodulator 120 may output a transport stream (TS) signal. Herein, the stream signal may be a signal obtained by multiplexing an image signal, an audio signal, and a data signal.

The TS signal output from the demodulator 120 may be input to the signal processing device 170. After performing demultiplexing and image/audio signal processing, the signal processing device 170 outputs an image to the display 180 and audio to the audio output device 185.

The external device interface 130 may transmit or receive data to or from an external device connected thereto. To this end, the external device interface 130 may include an audio/video (A/V) input/output device (not shown) or a wireless transceiver (not shown).

The external device interface 130 may be connected to external devices such as a digital versatile disc (DVD), a Blu-ray player, a game console, a camera, a camcorder, a (notebook) computer, and a set-top box in a wired/wireless manner and perform input/output operations with external devices.

The A/V input/output device may receive image and audio signals from an external device. The wireless transceiver may perform short-range wireless communication with other electronic devices.

The network interface 135 provides an interface for connecting the image display apparatus 100 with a wired/wireless network including the Internet. For example, the network interface 135 may receive content or data provided by an Internet or content provider or a network operator over a network.

The memory 140 may store programs for processing and control of signals in the signal processing device 170 and also store a signal-processed image, audio, or data signal.

The memory 140 may function to temporarily store an image signal, an audio signal, or a data signal input through the external device interface 130. In addition, the memory 140 may store information about a predetermined broadcast channel through the channel memorization function such as a channel map.

Although FIG. 2 illustrates an example in which the memory 140 is provided separately from the signal processing device 170, the present disclosure is not limited thereto. The memory 140 may be included in the signal processing device 170.

The user input interface 150 may transmit a signal input by a user to the signal processing device 170 or transmit a signal from the signal processing device 170 to the user.

For example, the user input interface 150 may transmit/receive user input signals such as power on/off, channel selection, and screen window setting to/from the remote control device 200 or transmit user input signals input through local keys (not shown) such as a power key, a channel key, a volume key, or a setting key to the signal processing device 170. The user input interface 150 may transmit user input signals input through a sensor device (not shown) to sense gesture of the user to the signal processing device 170 or transmit a signal from the signal processing device 170 to the sensor device (not shown).

The signal processing device 170 may demultiplex the TS signal input through the tuner 110, the demodulator 120, or the external device interface 130 or process the demultiplexed signal to generate a signal for outputting an image or audio.

The image signal processed by the signal processing device 170 may be input to the display 180 such that an image corresponding to the image signal may be displayed on the display. In addition, the image signal processed by the signal processing device 170 may be input to an external output device through the external device interface 130.

The audio signal processed by the signal processing device 170 may be output to the audio output device 185 in the form of sound. In addition, the audio signal processed by the signal processing device 170 may be input to an external output device through the external device interface 130.

Although not shown in FIG. 2, the signal processing device 170 may include a demultiplexer and an image processor, which will be described later with reference to FIG. 3.

Additionally, the signal processing device 170 may control the overall operation of the image display apparatus 100. For example, the signal processing device 170 may control the tuner 110 to tune to an RF broadcast corresponding to a channel selected by the user or a prestored channel.

The signal processing device 170 may control the image display apparatus 100 according to a user command input through the user input interface 150 or according to an internal program.

The signal processing device 170 may control the display 180 to display an image. Herein, the image displayed on the display 180 may be a still image, a moving image, a 2D image, or a 3D image.

The signal processing device 170 may control the predetermined 2D object in an image displayed on the display 180 as a 3D object. For example, the object may be at least one of an accessed web page (a newspaper, a magazine, etc.), an electronic program guide (EPG), various menus, a widget, an icon, a still image, a moving image or text.

Such a 3D object may be processed to have a sense of depth different from that of the image displayed on the display 180. Desirably, the 3D object may be processed to appear to protrude from the image displayed on the display 180.

The signal processing device 170 may recognize the location of the user based on an image captured by a capture device (not shown). For example, the signal processing device 170 may recognize the distance between the user and the image display apparatus 100 (i.e., a z-axis coordinate). Additionally, the signal processing device 170 may recognize an x-axis coordinate and a y-axis coordinate in the display 180, corresponding to the location of the user.

Although not illustrated in FIG. 2, the image display apparatus 100 may further include a channel browsing processor for generating a thumbnail image corresponding to a channel signal or an external input signal. The channel browsing processor may receive a TS signal output from the demodulator 120 or a TS signal output from the external device interface 130, extract an image from the received TS signal, and generate a thumbnail image. The generated thumbnail image may be TS-decoded together with a decoded image and then input to the signal processing device 170. The signal processing device 170 may display a thumbnail list including a plurality of thumbnail images on the display 180 using received thumbnail images.

The thumbnail list may be displayed in a brief viewing manner in which the thumbnail list is displayed in a portion of the display 180 on which an image is being displayed or in a full viewing manner in which the thumbnail list is displayed over most of the display 180. Thumbnail images in the thumbnail list may be sequentially updated.

The display 180 generates drive signals by converting an image signal, a data signal, an on-screen display (OSD) signal, and a control signal processed by the signal processing device 170 or an image signal, a data signal, and a control signal received from the external device interface 130.

The display 180 may be a plasma display panel (PDP), a liquid crystal display (LCD), an organic light emitting diode (OLED) display, a flexible display, or a 3D display.

For 3D image viewing, the display 180 may be divided into a supplementary display type and a single display type.

In the single display type, a 3D image may be implemented on the display 180 alone without a separate subsidiary device, e.g., glasses. Examples of the single display type may include various types such as a lenticular type and a parallax barrier type.

In the supplementary display type, a 3D image may be implemented using a subsidiary device as a viewing device (not shown), in addition to the display 180. Examples of the supplementary display type may include various types such as a head-mounted display (HMD) type and a glasses type.

The glasses type may be divided into a passive type such as a polarized glasses type and an active type such as a shutter glasses type. The HMD type may be divided into a passive type and an active type.

The viewing device (not shown) may be 3D glasses that enable 3D image viewing. The 3D glasses (not shown) may be passive-type polarized glasses or active-type shutter glasses. The 3D glasses may also be understood as conceptually including the HMD type.

The display 180 may include a touchscreen and may function as an input device as well as an output device.

The audio output device 185 receives an audio signal processed by the signal processing device 170 and outputs audio.

A capture device (not shown) captures an image of the user. The capture device (not shown) may be implemented using one camera. However, the present disclosure is not limited thereto, and the capture device (not shown) may be implemented using a plurality of cameras. The capture device (not shown) may be buried in an upper portion of the display 180 of the image display apparatus 100 or may be separately disposed. Information about the image captured by the capture device (not shown) may be input to the signal processing device 170.

The signal processing device 170 may sense a user's gesture based on the image captured by the capture device (not shown), the signal sensed by the sensor device (not shown), or a combination thereof.

The power supply 190 supplies power to overall parts of the image display apparatus 100. In particular, the power supply 190 may supply power to the signal processing device 170, which may be implemented in the form of system-on-chip (SOC), the display 180 for displaying images, and the audio output device 185 for outputting audio signals.

Specifically, the power supply 190 may include a converter for converting alternating current (AC) power into direct current (DC) power and a DC-DC converter for changing the level of the DC power.

The remote control device 200 transmits a user input signal to the user input interface 150. To this end, the remote control device 200 may use Bluetooth, RF communication, infrared (IR) communication, ultra-wideband (UWB), or ZigBee. In addition, the remote control device 200 may receive an image signal, an audio signal, or a data signal from the user input interface 150 and then display or audibly output the received signal.

The image display apparatus 100 may be a fixed or mobile digital broadcast receiver capable of receiving a digital broadcast.

FIG. 2 is a block diagram of the image display apparatus 100 according to an embodiment of the present disclosure. Some of the constituents of the image display apparatus shown in the diagram may be combined or omitted or other constituents may be added thereto, according to specifications of the image display apparatus 100 as actually implemented. That is, two or more constituents of the image display apparatus 100 may be combined into one constituent or one constituent thereof may be subdivided into two or more constituents, as needed. In addition, a function performed in each block is simply illustrative and specific operations or units of the block do not limit the scope of the present disclosure.

Meanwhile, unlike FIG. 2, the image display apparatus 100 may not include the tuner 110 and the demodulator 120. Instead, the image display apparatus 100 may receive and reproduce image content through the network interface 135 or the external device interface 130.

The image display apparatus 100 is an exemplary image signal processing apparatus for processing signals of images stored therein or signals of input images. Another example of the image signal processing apparatus may be the above-described set-top box, DVD player, Blu-ray player, game console, or computer except for the display 180 and the audio output device 185 shown in FIG. 2.

Figure 3:
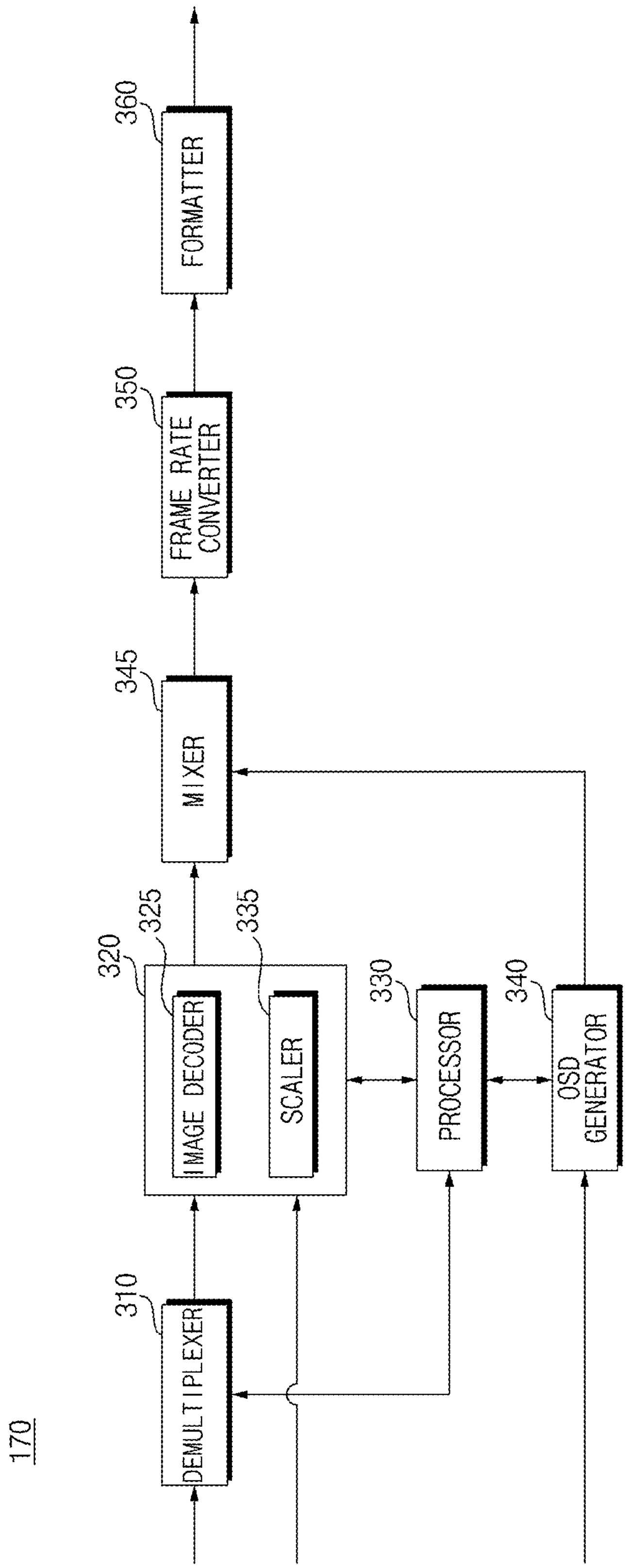
FIG. 3 is an internal block diagram of a controller of the image display apparatus of FIG. 2.

FIG. 3 is an internal block diagram of the controller shown in FIG. 2.

Referring to FIG. 3, the signal processing device 170 according to an embodiment of the present disclosure may include a demultiplexer 310, an image processor 320, a processor 330, an OSD generator 340, a mixer 345, a frame rate converter 350, and a formatter 360. The signal processing device 170 may further include an audio processor (not shown) and a data processor (not shown).

The demultiplexer 310 demultiplexes an input TS signal. For example, when an MPEG-2 TS signal is input, the demultiplexer 310 may demultiplex the MPEG-2 TS signal into an image signal, an audio signal, and a data signal. Herein, the TS signal input to the demultiplexer 310 may be a TS signal output from the tuner 110, the demodulator 120, or the external device interface 130.

The image processor 320 may perform image processing on the demultiplexed image signal. To this end, the image processor 320 may include an image decoder 325 and a scaler 335.

The image decoder 325 decodes the demultiplexed image signal and the scaler 335 scales the resolution of the decoded image signal for outputting the image signal through the display 180.

The image decoder 325 may include various types of decoders.

The image signal decoded by the image processor 320 may include a 2D image signal alone, a mixture of a 2D image signal and a 3D image signal, or a 3D image signal alone.

For example, an external image signal received from an external device or a broadcast image signal of a broadcast signal received through the tuner 110 may include the 2D image signal alone, a mixture of the 2D image signal and the 3D image signal, or the 3D image signal alone. Accordingly, the signal processing device 170, more specifically, the image processor 320, may perform signal processing upon the external image signal or the broadcast image signal to output the 2D image signal, a mixture of the 2D image signal and the 3D image signal, or the 3D image signal.

The image signal decoded by the image processor 320 may include a 3D image signal in various formats. For example, the decoded image signal may be a 3D image signal that includes a color difference image and a depth image or a 3D image signal that includes multi-viewpoint image signals. The multi-viewpoint image signals may include a left-eye image signal and a right-eye image signal, for example.

The formats of the 3D image signal may include a side-by-side format in which the left-eye image L and the right-eye image R are arranged in a horizontal direction, a top/down format in which the left-eye image and the right-eye image are arranged in a vertical direction, a frame sequential format in which the left-eye image and the right-eye image are arranged in a time division manner, an interlaced format in which the left-eye image and the right-eye image are mixed in lines, and a checker box format in which the left-eye image and the right-eye image are mixed in each box.

The processor 330 may control the overall operation of the image display apparatus 100 or the signal processing device 170. For example, the processor 330 may control the tuner 110 to tune to an RF broadcasting corresponding to a channel selected by the user or a prestored channel.

In addition, the processor 330 may control the image display apparatus 100 according to a user command input through the user input interface 150 or according to an internal program.

The processor 330 may control data transmission to the network interface 135 or the external device interface 130.

The processor 330 may control operations of the demultiplexer 310, image processor 320 and OSD generator 340 in the signal processing device 170.

The OSD generator 340 generates an OSD signal autonomously or according to a user input signal. For example, the OSD generator 340 may generate a signal for displaying a variety of information in the form of graphics or texts on the screen of the display 180 based on a user input signal. The generated OSD signal may include a variety of data such as a user interface screen, various menu screens, a widget, and an icon of the image display apparatus 100. The generated OSD signal may also include a 2D object or a 3D object.

The OSD generator 340 may generate a pointer which can be displayed on the display, based on a pointing signal input from the remote control device 200. In particular, the pointer may be generated by a pointing signal processor (not shown) and the OSD generator 240 may include the pointing signal generator (not shown). Obviously, it is possible to provide the pointing signal processor (not shown) separately from the OSD generator 240.

The mixer 345 may mix the OSD signal generated by the OSD generator 340 with the image signal decoded by the image processor 320. Each of the OSD signal and the decoded image signal may include at least one of a 2D signal or a 3D signal. The mixed image signal is provided to the frame rate converter 350.

The frame rate converter (FRC) 350 may convert the frame rate of an input image. The FRC 350 may also directly output the input image without frame rate conversion.

The formatter 360 may arrange a left-eye image frame and right-eye image frame of the 3D image produced through frame rate conversion. The formatter 360 may output a synchronization signal Vsync to open a left-eye glass or right-eye glass of a 3D viewing apparatus (not shown).

The formatter 360 may receive the mixed signal, i.e., a mixture of the OSD signal and the decoded image signal, from the mixer 345 and separate the mixed signal into a 2D image signal and a 3D image signal.

The formatter 360 may change the format of the 3D image signal. For example, the formatter 360 may change the format of the 3D image signal to any of the various formats described above.

The formatter 360 may convert the 2D image signal into the 3D image signal. For example, the formatter 360 may detect an edge or a selectable object in the 2D image signal and separate and generate an object according to the detected edge or the selectable object as the 3D image signal, based on a 3D image generation algorithm. In this case, the generated 3D image signal may be separated into the left-eye image signal L and the right-eye image signal R to be aligned, as described above.

Although not shown in the figure, a 3D processor (not shown) for 3-D effect signal processing may be further disposed after the formatter 360. The 3D processor (not shown) may perform processing such as adjustment of brightness, tint, and color of an image signal to improve a 3D effect. For example, the 3D processor may perform signal processing of making parts at a close distance clear and making parts at a far distance blurry. Such functions of the 3D processor may be integrated into the formatter 360 or the image processor 320.

An audio processor (not shown) in the signal processing device 170 may process the demultiplexed audio signal. To this end, the audio processor (not shown) may include various decoders.

The audio processor (not shown) in the signal processing device 170 may perform processing such as adjustment of bass, treble, and volume.

The data processor (not shown) in the signal processing device 170 may perform data processing on the demultiplexed data signal. For example, if the demultiplexed data signal is a coded data signal, the data processor (not shown) may decode the data signal. The coded data signal may be EPG information containing broadcast information such as a start time and end time of a broadcast program broadcast on each channel.

Although the formatter 360 performs 3D processing after the mixer 345 mixes the signals received from the OSD generator 340 and the image processor 320 in FIG. 3, the present disclosure is not limited thereto and the mixer 345 may be disposed after the formatter 360. That is, after the formatter 360 performs 3D processing on the output of the image processor 320 and the OSD generator 340 generates the OSD signal and performs 3D processing, the mixer 345 may mix the 3D processed signals.

The block diagram of the signal processing device 170 shown in FIG. 3 is simply illustrative. Constituents of the block diagram may be integrated, added or omitted according to the specifications of the signal processing device 170 as actually implemented.

In particular, the frame rate converter 350 and the formatter 360 may not be provided in the signal processing device 170. Instead, they may be provided individually or provided as one separate module.

Figure 4:
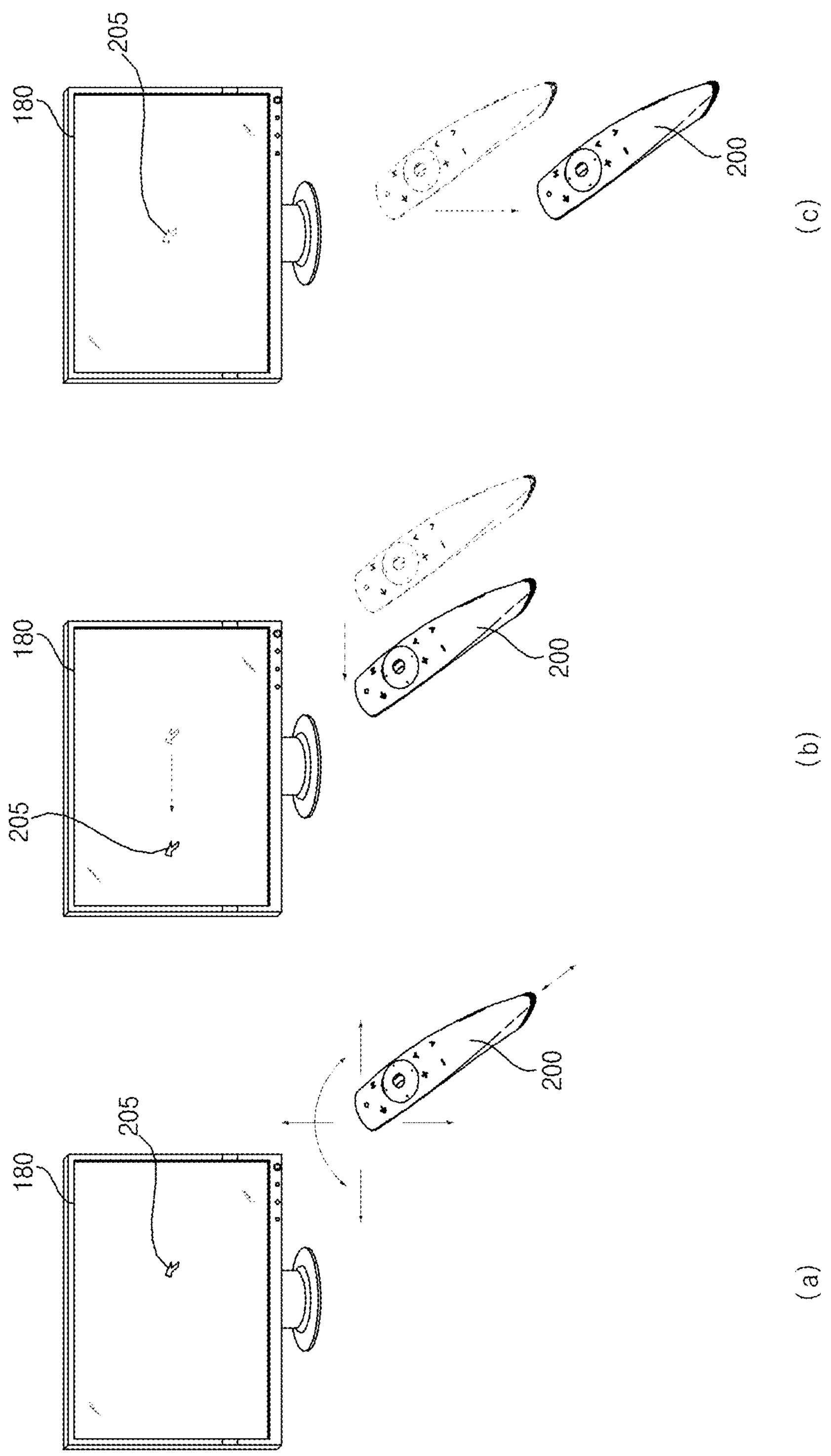
FIG. 4 illustrates a method of controlling a remote control device of the image display apparatus of FIG. 2.

FIG. 4 illustrates a method of controlling the remote control device shown in FIG. 2.

As shown in (a) of FIG. 4, a pointer 205 corresponding to the remote control device 200 may be displayed on the display 180.

A user may move the remote control device 200 up and down, left and right (see (b) of FIG. 4), or back and forth (see (c) of FIG. 4) or rotate the same. The pointer 205 displayed on the display 180 of the image display apparatus moves according to movement of the remote control device 200. As shown in the figure, since the pointer 205 moves according to movement of the remote control device 200 in a 3D space, the remote control device 200 may be referred to as a spatial remote controller or a 3D pointing device.

(b) of FIG. 4 illustrates a case in which the pointer 205 displayed on the display 180 moves to the left when the user moves the remote control device 200 to the left.

Information about movement of the remote control device 200 sensed through a sensor of the remote control device 200 is transmitted to the image display apparatus. The image display apparatus may calculate coordinates of the pointer 205 based on the information about the movement of the remote control device 200. The image display apparatus may display the pointer 205 such that the pointer 205 corresponds to the calculated coordinates.

(c) of FIG. 4 illustrates a case in which the user moves the remote control device 200 away from display 180 while pressing down a specific button on the remote control device 200. In this case, a selected area on the display 180 corresponding to the pointer 205 may be zoomed in and displayed with a magnified size. By contrast, when the user moves the remote control device 200 closer to the display 180, the selected area may be zoomed out and displayed with a reduced size. Alternatively, the selected area may be zoomed out when the remote control device 200 is moved away from the display 180 and may be zoomed in when the remote control device 200 is moved closer to the display 180.

Up-and-down and left-and-right movements of the remote control device 200 may not be recognized while the specific button on the remote control device 200 is pressed down. That is, when the remote control device 200 moves away from the display 180 or approaches the display 180, the up-and-down and left-and-right movements of the remote control device 200 may not be recognized and only a back-and-forth movement of the remote control device 200 may be recognized. When the specific button on the remote control device 200 is not pressed down, only the pointer 205 moves according to the up-and-down and left-and-right movements of the remote control device 200.

The speed and direction of movement of the pointer 205 may correspond to the speed and direction of movement of the remote control device 200.

Figure 5:
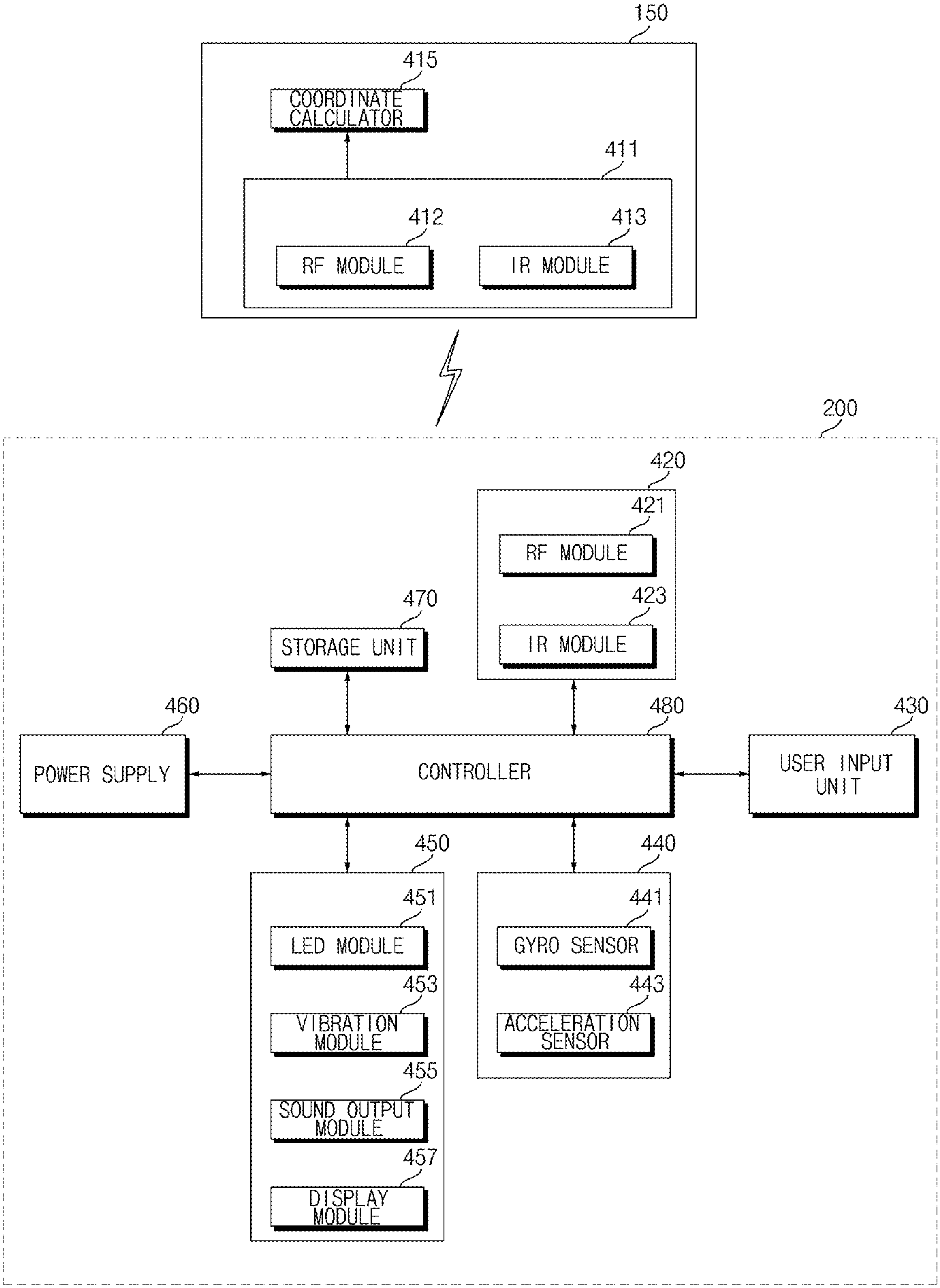
FIG. 5 is an internal block diagram of the remote control device of the image display apparatus of FIG. 2.

FIG. 5 is an internal block diagram of the remote control device shown in FIG. 2.

Referring to FIG. 5, the remote control device 200 may include a wireless transceiver 420, a user input device 430, a sensor device 440, an output device 450, a power supply 460, a memory 470, and a controller 480.

The wireless transceiver 420 transmits and receives signals to and from one of the image display apparatuses according to embodiments of the present disclosure described above. Hereinafter, one image display apparatus 100 among the image display apparatuses according to embodiments of the present disclosure will be described by way of example.

In this embodiment, the wireless transceiver 420 may include an RF module 421 capable of transmitting and receiving signals to and from the image display apparatus 100 according to an RF communication standard. The wireless transceiver 420 may further include an IR module 423 capable of transmitting and receiving signals to and from the image display apparatus 100 according to an IR communication standard.

In this embodiment, the remote control device 200 transmits a signal containing information about movement of the remote control device 200 to the image display apparatus 100 via the RF module 421.

In addition, the remote control device 200 may receive a signal from the image display apparatus 100 via the RF module 421. As needed, the remote control device 200 may transmit commands related to power on/off, channel change, and volume change to the image display apparatus 100 via the IR module 423.

The user input device 430 may include a keypad, buttons, a touchpad, or a touchscreen. The user may input a command related to the display apparatus 100 to the remote control device 200 by manipulating the user input device 430. When the user input device 430 includes a hard key button, the user may input a command related to the image display apparatus 100 to the remote control device 200 by pressing the hard key button. When the user input device 430 includes a touchscreen, the user may input a command related to the image display apparatus 100 to the remote control device 200 by touching a soft key on the touchscreen. The user input device 430 may include various types of input means such as a scroll key and a jog key which can be manipulated by the user and this embodiment does not limit the scope of the present disclosure.

The sensor device 440 may include a gyro sensor 441 or an acceleration sensor 443. The gyro sensor 441 may sense information about movement of the remote control device 200 . . . .

For example, the gyro sensor 441 may sense information about movement of the remote control device 200 with respect to the X, Y and Z axes. The acceleration sensor 443 may sense information about the movement speed of the remote control device 200. The sensor device 440 may further include a distance measurement sensor to sense a distance to the display 180.

The output device 450 may output an image signal or audio signal corresponding to manipulation of the user input interface 435 or the signal transmitted by the image display apparatus 100. The user may recognize, via the output device 450, whether the user input interface 435 is manipulated or the image display apparatus 100 is controlled.

For example, the output device 450 may include an LED module 451 to be turned on, a vibration module 453 to generate vibration, a sound output module 455 to output sound, or a display module 457 to output an image, when the user input interface 435 is manipulated or signals are transmitted to and received from the image display apparatus 100 via the wireless transceiver 425.

The power supply 460 supplies power to the remote control device 200. When the remote control device 200 does not move for a predetermined time, the power supply 460 may stop supplying power to reduce waste of power. The power supply 460 may resume supply of power when a predetermined key provided to the remote control device 200 is manipulated.

The memory 470 may store various types of programs and application data necessary for control or operation of the remote control device 200. When the remote control device 200 wirelessly transmits and receives signals to and from the image display apparatus 100 via the RF module 421, the remote control device 200 and the image display apparatus 100 may transmit and receive signals in a predetermined frequency band. The controller 480 of the remote control device 200 may store, in the memory 470, information about a frequency band enabling wireless transmission and reception of signals to and from the image display apparatus 100 which is paired with the remote control device 200, and reference the information.

The controller 480 controls overall operation related to control of the remote control device 200. The controller 480 may transmit a signal corresponding to manipulation of a predetermined key in the user input interface 435 or a signal corresponding to movement of the remote control device 200 sensed by the sensor device 440 to the image display apparatus 100 via the wireless transceiver 420.

The user input interface 150 of the image display apparatus 100 may include a wireless transceiver 411 capable of wirelessly transmitting and receiving signals to and from the remote control device 200 and a coordinate calculator 415 capable of calculating coordinates of a pointer corresponding to operation of the remote control device 200.

The user input interface 150 may wirelessly transmit and receive signals to and from the remote control device 200 via an RF module 412. In addition, the user input interface 150 may receive, via an IR module 413, a signal transmitted from the remote control device 200 according to an IR communication standard.

The coordinate calculator 415 may calculate a coordinate value (x, y) of the pointer 205 to be displayed on the display 180 by correcting hand shaking or errors in a signal corresponding to operation of the remote control device 200, which is received via the wireless transceiver 411.

The signal which is transmitted by the remote control device 200 and input to the image display apparatus 100 via the user input interface 150 is transmitted to the signal processing device 170 of the image display apparatus 100. The signal processing device 170 may determine information about an operation of the remote control device 200 or manipulation of a key from the signal transmitted by the remote control device 200 and control the image display apparatus 100 based on the information.

As another example, the remote control device 200 may calculate a coordinate value of a pointer corresponding to movement thereof and output the coordinate value to the user input interface 150 of the image display apparatus 100. In this case, the user input interface 150 of the image display apparatus 100 may transmit, to the signal processing device 170, information about the received coordinate value of the pointer without separately correcting hand tremor or errors.

As another example, the coordinate calculator 415 may be provided in the signal processing device 170 rather than in the user input interface 150 as opposed to FIG. 5.

Figure 6:
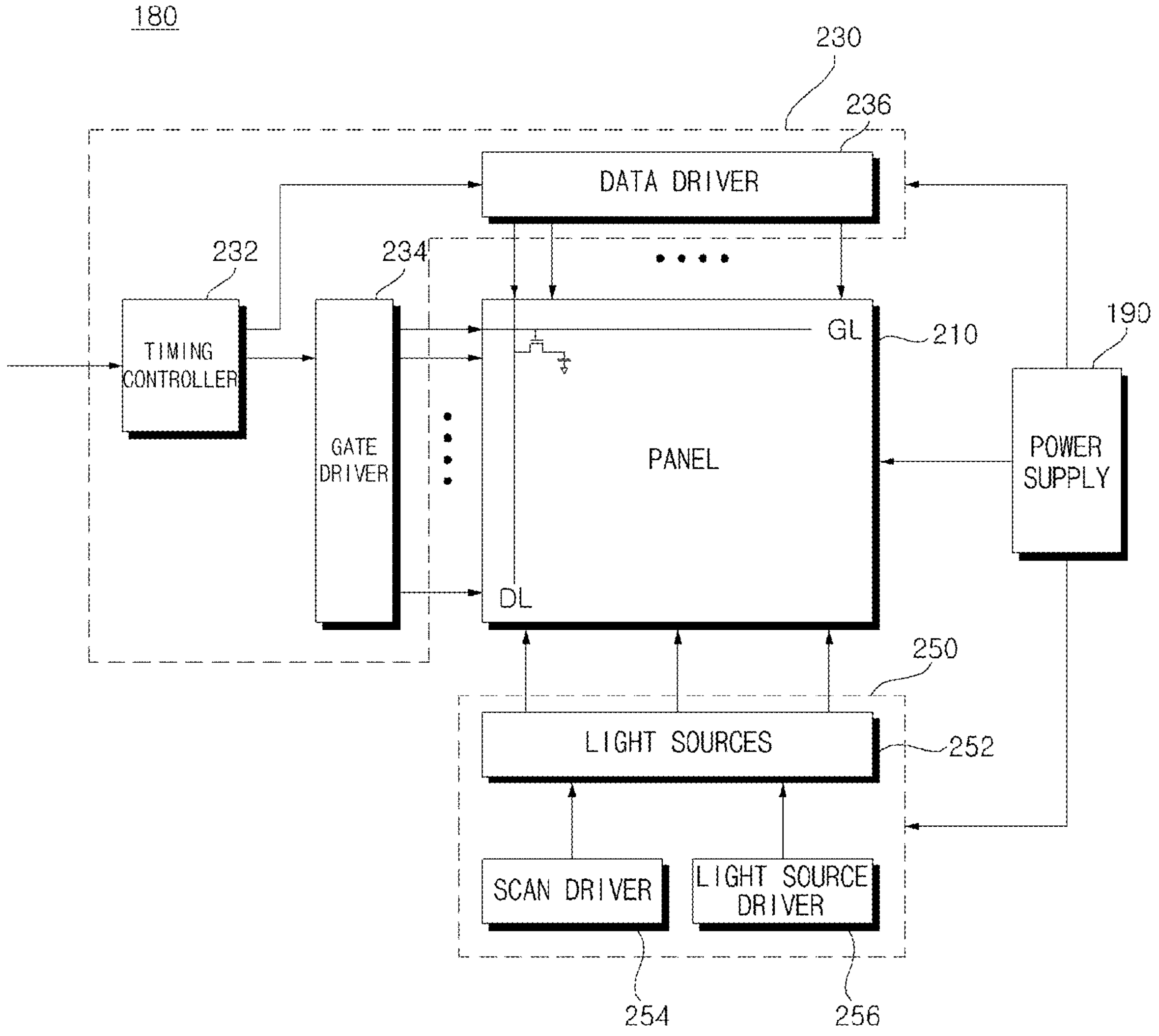
FIG. 6 illustrates an example of a power supply and an internal construction of a display shown in FIG. 2.

FIG. 6 illustrates an example of the power supply and an internal construction of the display shown in FIG. 2.

Referring to FIG. 6, the LCD panel-based display 180 may include an LCD panel 210, a driving circuit 230, and a backlight 250.

To display images, the LCD panel 210 includes a first substrate on which a plurality of gate lines GL and a plurality of data lines DL intersect in a matrix form and thin film transistors (TFTs) and pixel electrodes connected to the TFTs are formed at the intersections, a second substrate including common electrodes, and a liquid crystal layer formed between the first substrate and the second substrate.

The driving circuit 230 drives the LCD panel 210 through a control signal and a data signal supplied by the signal processing device 170 of FIG. 2. To this end, the driving circuit 230 may include a timing controller 232, a gate driver 234, and a data driver 236.

The timing controller 232 receives a control signal, an RGB data signal, and a vertical synchronization signal Vsync from the signal processing device 170, controls the gate driver 234 and the data driver 236 based on the control signal, re-arranges the RGB data signal, and provides the re-arranged RGB data signal to the data driver 236.

The gate driver 234 and the data driver 236 provide a scan signal and a video signal to the LCD panel 210 through the gate lines GL and the data lines DL under the control of the timing controller 232.

The backlight 250 supplies light to the LCD panel 210. To this end, the backlight 250 may include a plurality of light sources 252, a scan driver 254 for controlling scanning operation of the light sources 252, and a light source driver 256 for turning on or off the light sources 252.

A predetermined image is displayed by light emitted from the backlight 250 in a state in which light transmittance of the liquid crystal layer is controlled by an electrical field between the pixel electrodes and the common electrodes of the LCD panel 210.

The power supply 190 may supply a common electrode voltage Vcom to the LCD panel 210 and a gamma voltage to the data driver 236. In addition, the power supply 190 supplies a driving voltage for driving the light sources 252 to the backlight 250.

Figure 7:
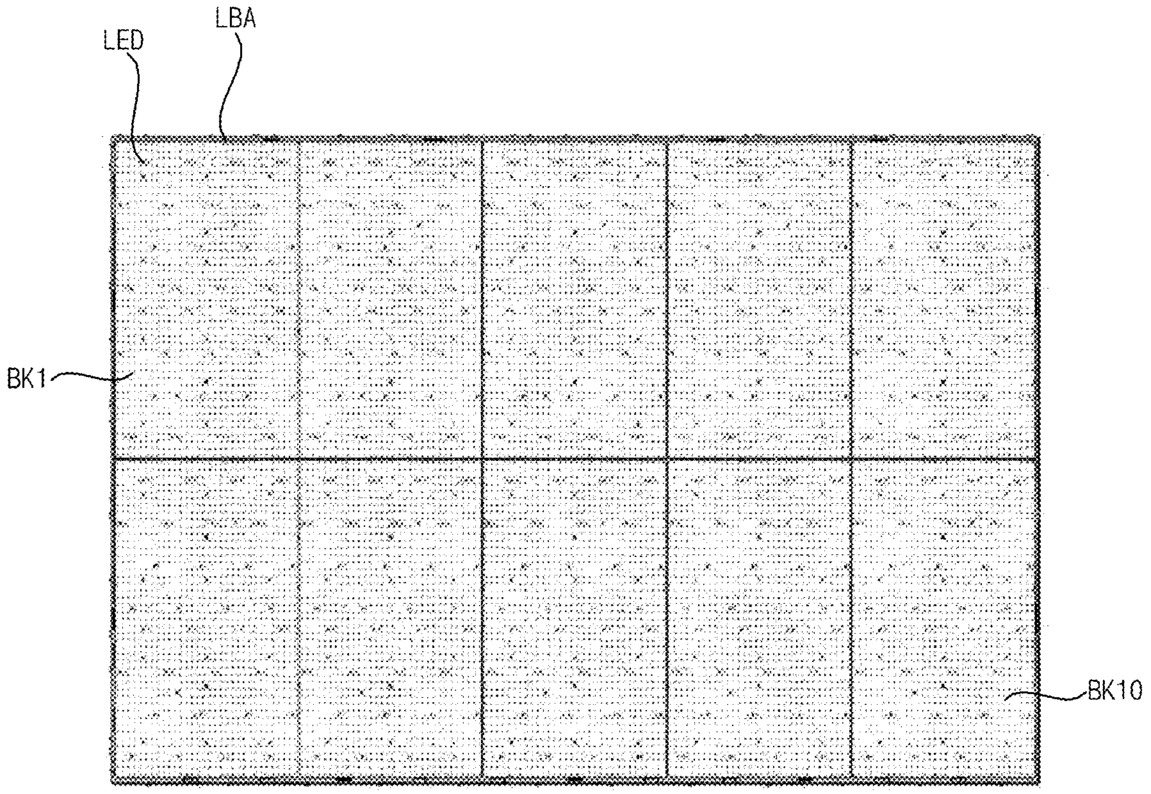
FIG. 7 illustrates exemplary arrangement of light sources shown in FIG. 6.

FIG. 7 illustrates exemplary arrangement of the light sources shown in FIG. 6.

Referring to FIG. 7, a light source plate LBA including a plurality of light sources may be disposed on the rear surface of the LCD panel 210.

The light source plate LBA may include a plurality of light source block arrays BK1 to BK10, and although ten light source block arrays BK1 to BK10 are illustrated in the figure, various modifications are possible.

Meanwhile, each of the light source block arrays BK1 to BK10 includes a plurality of light sources, and each light source may include an LED.

In this case, when the size of the LED or a distance between LEDs is in mm, the light source plate LBA may be a mini LED-based light source plate.

Alternatively, when the size of the LED or the distance between LEDs is in μm, the light source plate LBA may be a micro LED-based light source plate.

Figure 8:
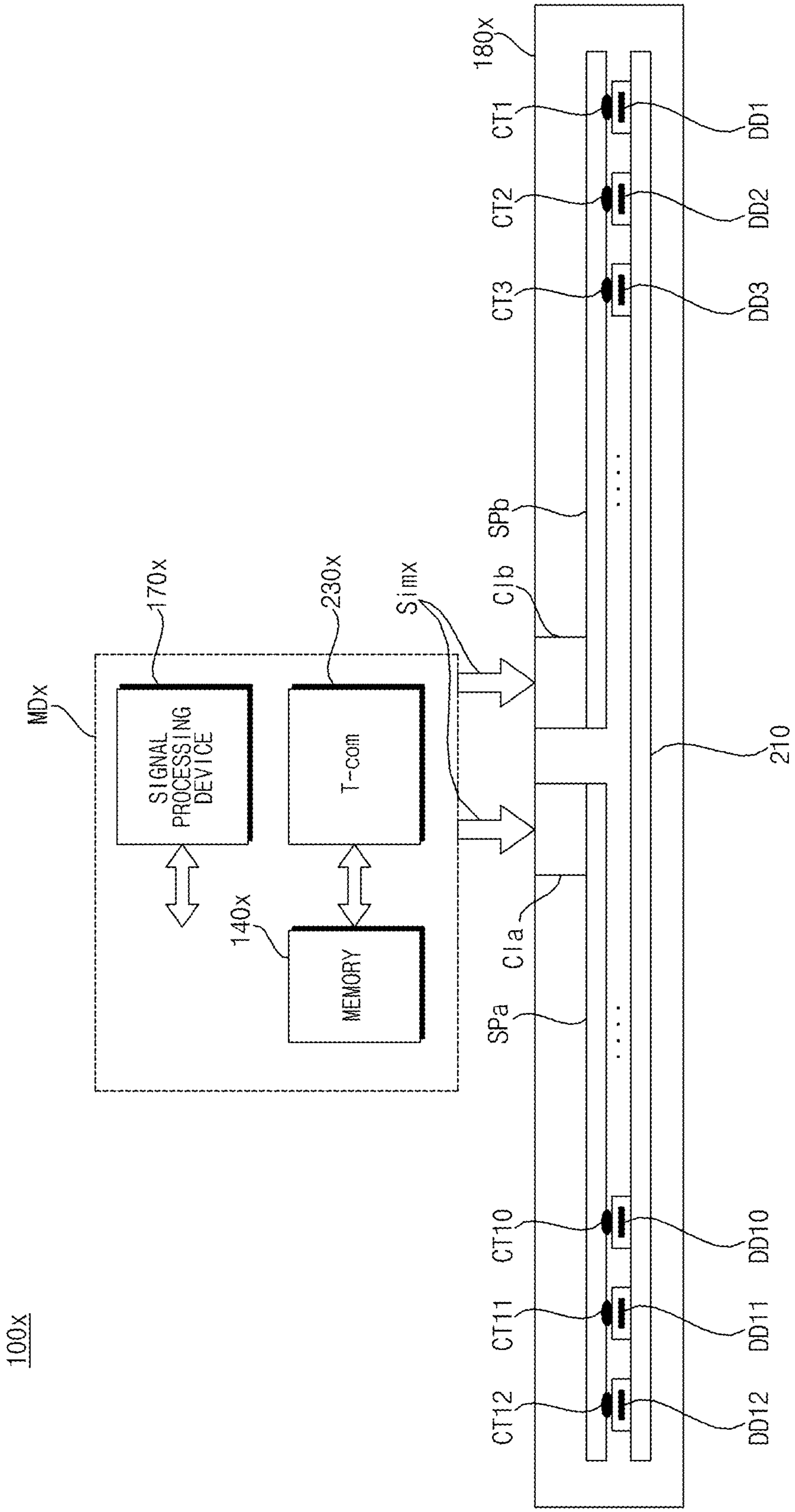
FIG. 8 is an exemplary internal block diagram of an image display apparatus related to the present disclosure.

FIG. 8 is an exemplary internal block diagram of an image display apparatus related to the present disclosure.

Referring to FIG. 8, an image display apparatus 100*x* related to the present disclosure may include a main board MDx having a memory 140*x*, a timing controller 232*x* and a signal processing device 170*x*, connector interfaces CIa and CIb to receive a differential signal from the timing controller 232*x*, and a display 180*x* including a plurality of data drivers DD1 to DD12 to drive a panel 210 based on the differential signal.

The plurality of data drivers DD1 to DD12 are mounted on circuit boards Spa and Spb.

Since the differential signal output from the timing controller 232*x* alternates between high level and low level, an eye diagram is obtained when measuring the differential signal.

FIGS. 9A to 9E are views referred to in description of the operation of the image display apparatus of FIG. 8.

Figure 9A:
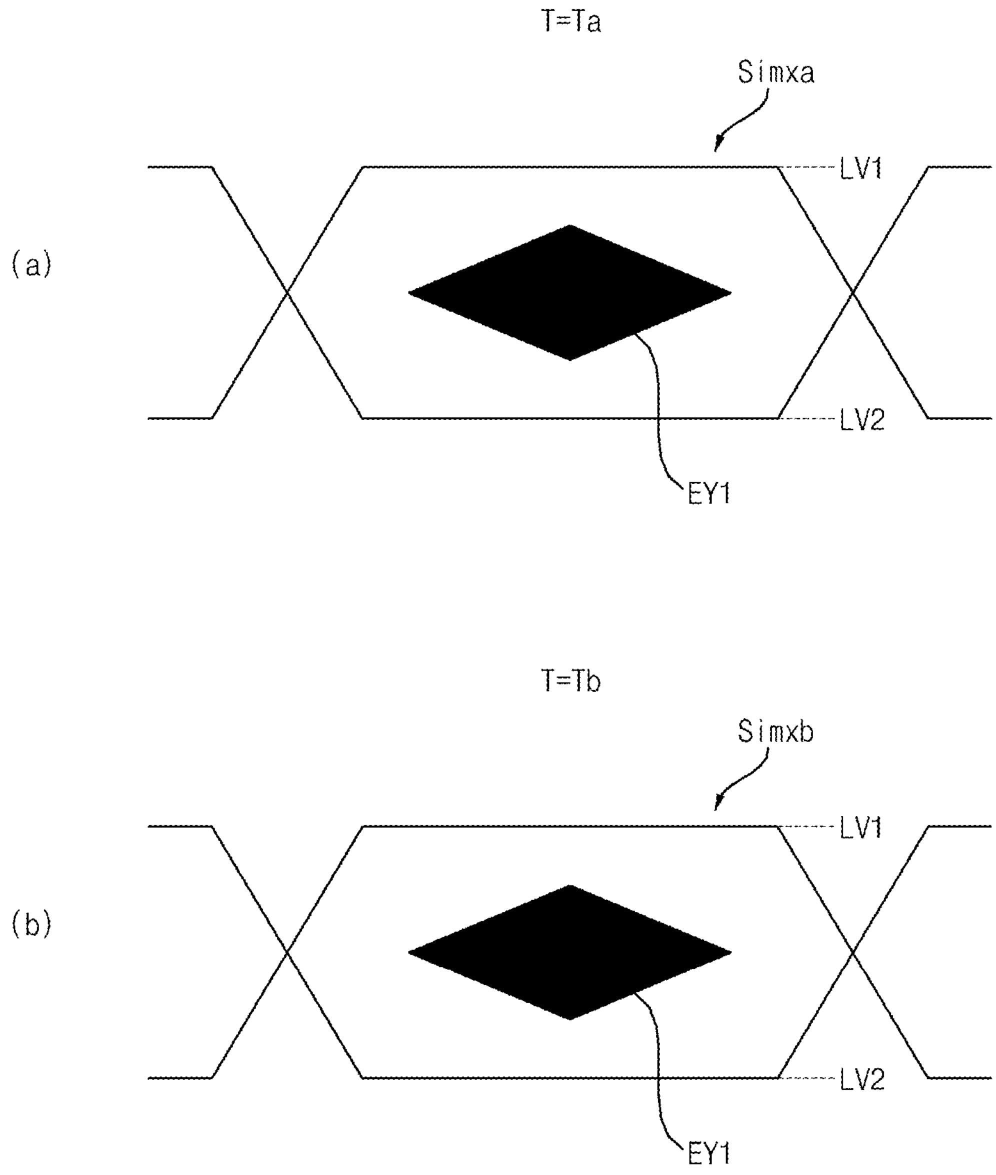
FIGS. 9A to 9E are views referred to in description of the operation of the image display apparatus of FIG. 8.

(a) of FIG. 9A illustrates a first differential signal Simxa when the temperature of or around the panel 210 being a first temperature Ta, and (b) of FIG. 9A illustrates a second differential signal Simxb when the temperature of or around the panel 210 being a second temperature Tb.

Here, the first temperature Ta may be 12° C. to 30° C., and the second temperature Tb may be approximately above 40° C.

In other words, the first temperature Ta may be room temperature, and the second temperature Tb may be a high temperature.

Meanwhile, FIG. 9A illustrates that the first differential signal Simxa and the second differential signal Simxb are the same differential signal regardless of the temperature of or around the panel 210.

Specifically, the first differential signal Simxa and the second differential signal Simxb of FIG. 9A may each have a first high level Lvl as high level and a first low level LV2 as low level.

Figure 9B:
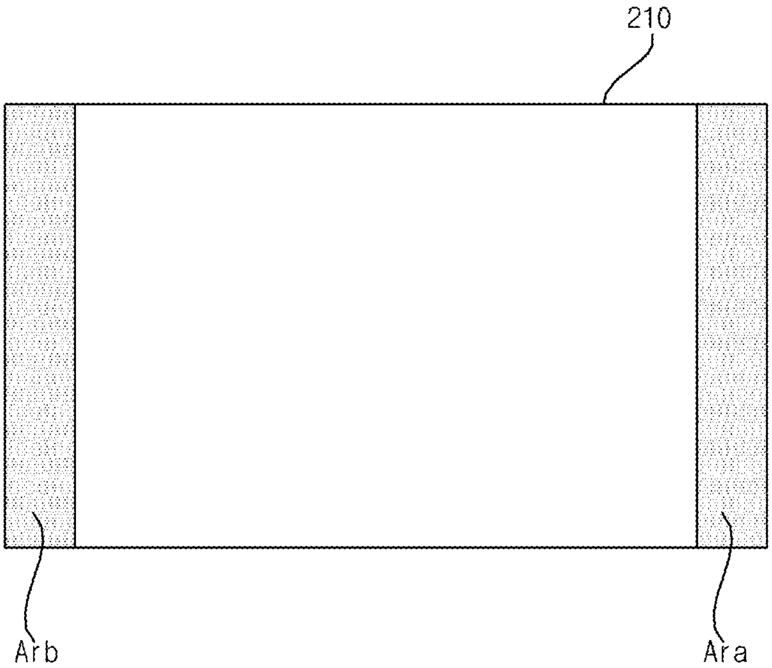

FIG. 9B illustrates that panel noise such as degradation is generated at opposite end portions (or areas) Ara and Arb of the panel 210 when the temperature of or around the panel 210 is a high temperature, as in the case of (b) of FIG. 9A.

As illustrated in FIG. 8, the plurality of data drivers DD1 to DD12 are arranged from opposite end portions to a central portion of the panel 210 while being spaced apart from each other.

As the connector interfaces CIa and CIb for receiving a differential signal from the timing controller 232*x* are disposed at the central area of the panel 210, among the plurality of data drivers DD1 to DD12, the data drivers DD6 and DD7 disposed at the central area of the panel 210 have a short electrical wire length, whereas the data drivers DD1 and DD12 disposed at the opposite end areas Ara and Arb of the panel 210 have a considerably long electrical wire length.

Due to such a difference in electrical wire length, when the temperature of or around the panel 210 is a high temperature of approximately above 40° C., panel noise such as degradation is generated at the opposite end portions Ara and Arb of the panel 210, as shown in FIG. 9B.

Such panel noise becomes more severe as the temperature of or around the panel 210 increases, the number of data drivers DD1, DD12 increases, or the resolution of the panel 210 increases.

Therefore, an embodiment of the present disclosure provides a method for reducing such panel noise. This will be described with reference to FIG. 10 and the subsequent figures.

Meanwhile, as a way to reduce panel noise of FIG. 9B, there may be a method of using a peak level section in the differential signal.

Figure 9C:
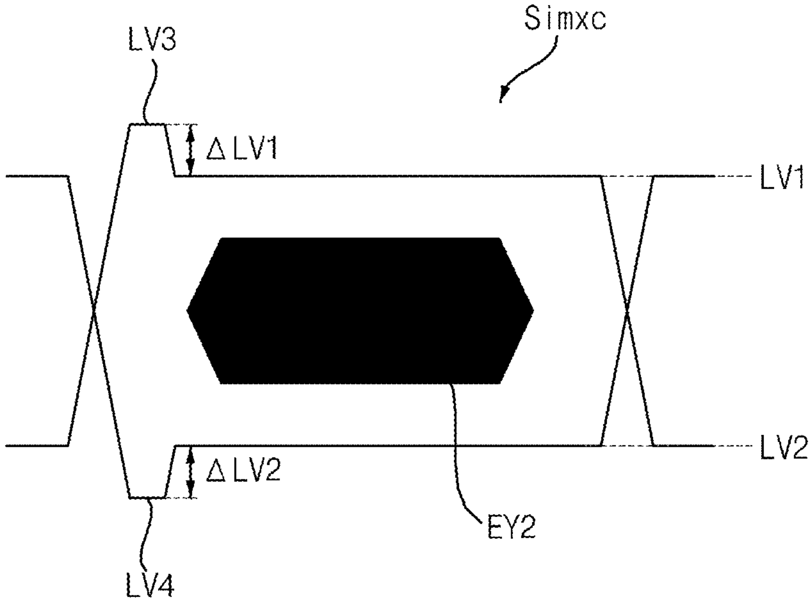

FIG. 9C illustrates a differential signal with a peak level.

Referring to FIG. 9C, the timing controller 232*x* may output a differential signal Simxc that rises to a first peak level LV3 and then falls to maintain a first high level LV1.

Meanwhile, the differential signal Simxc of FIG. 9C may fall to a second peak level LV4 and then rise to maintain a first low level LV2.

As shown in the figure, the section where the first peak level LV3 or the second peak level LV4 is applied may be referred to as a pre-emphasis period.

Meanwhile, as the differential signal Simxc has a difference ΔLV1 between the first peak level LV3 and the first high level LV1 and a difference ΔLV2 between the second peak level LV4 and the first low level LV2, even when the temperature of or around the panel 210 is a high temperature of approximately above 40° C., it is possible to suppress the occurrence of panel noise such as degradation at the opposite end portions Ara and Arb of the panel 210, as shown in FIG. 9B.

However, when the differential signal Simxc of FIG. 9C is output while the temperature of or around the panel 210 is the first temperature Ta corresponding to room temperature, electromagnetic noise is generated due to the difference ΔLV1 between the first peak level LV3 and the first high level LV1 and the difference ΔLV2 between the second peak level LV4 and the first low level LV2.

Figure 9D:
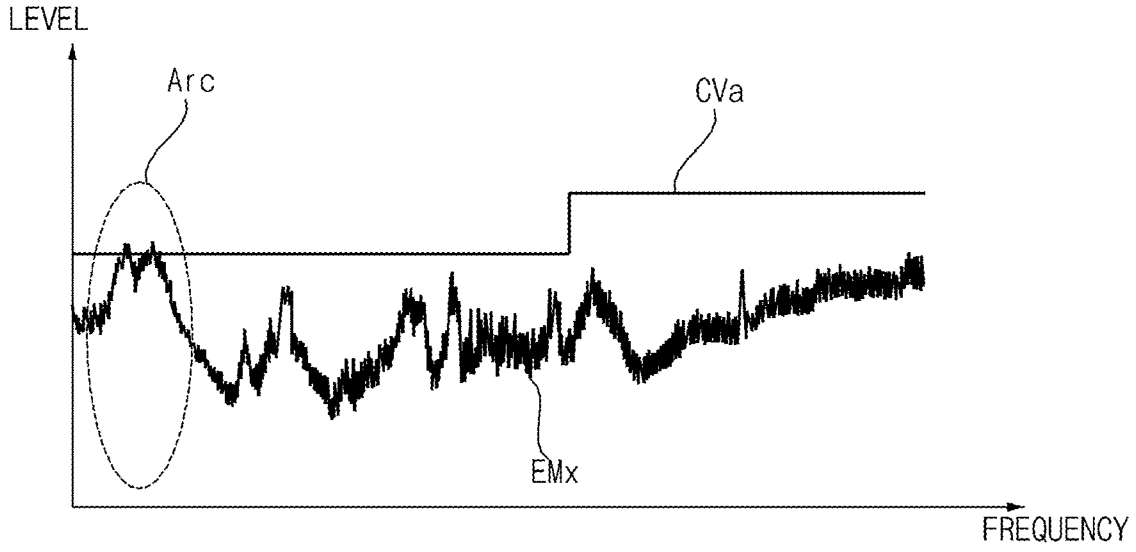

FIG. 9D illustrates electromagnetic noise caused by the differential signal Simxc of FIG. 9C.

Referring to FIG. 9D, electromagnetic noise EMx is generated due to the differential signal Simxc like FIG. 9C. In particular, compared to an electromagnetic margin curve Cva, electromagnetic noise is noticeable in a low frequency region Arc.

Therefore, an embodiment of the present disclosure provides a method for reducing electromagnetic noise when the temperature of or around the panel 210 is the first temperature Ta corresponding to room temperature. This will be described with reference to FIG. 10 and the subsequent figures.

Figure 9E:
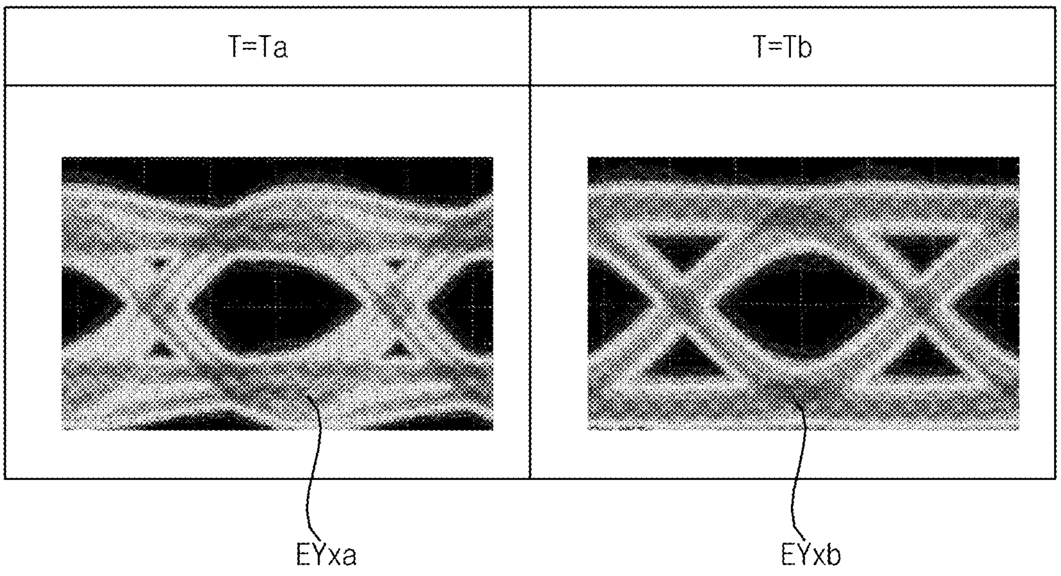

FIG. 9E illustrates an eye diagram obtained from the differential signal Simxc of FIG. 9C.

Referring to FIG. 9E, when the differential signal Simxc of FIG. 9C is output while the temperature of or around the panel 210 is the first temperature Ta corresponding to room temperature, an eye diagram Eyxa like (a) of FIG. 9E may be measured.

It can be seen from (a) of FIG. 9E that the shape of an eye in the eye diagram Eyxa is distorted due to the peak level in the pre-emphasis period.

By contrast, when the differential signal Simxc of FIG. 9C is output while the temperature of or around the panel 210 is the second temperature Tb corresponding to a high temperature, an eye diagram Eyxb like (b) of FIG. 9E may be measured.

It can be seen from (b) of FIG. 9E that, despite the peak level in the pre-emphasis period, the shape of an eye in the eye diagram Eyxb is represented as normal (undistorted).

That is, referring to FIGS. 9D to 9E, due to the differential signal Simxc having a peak level in the pre-emphasis period, electromagnetic noise or distortion of the shape of the eye in the eye diagram Eyxa occurs when the temperature of or around the panel 210 is the first temperature Ta, which is in the normal range.

Therefore, an embodiment of the present disclosure provides a method for reducing electromagnetic noise or the like when the temperature of or around the panel 210 corresponds to room temperature. This will be described with reference to FIG. 10 and the subsequent figures.

Figure 10:
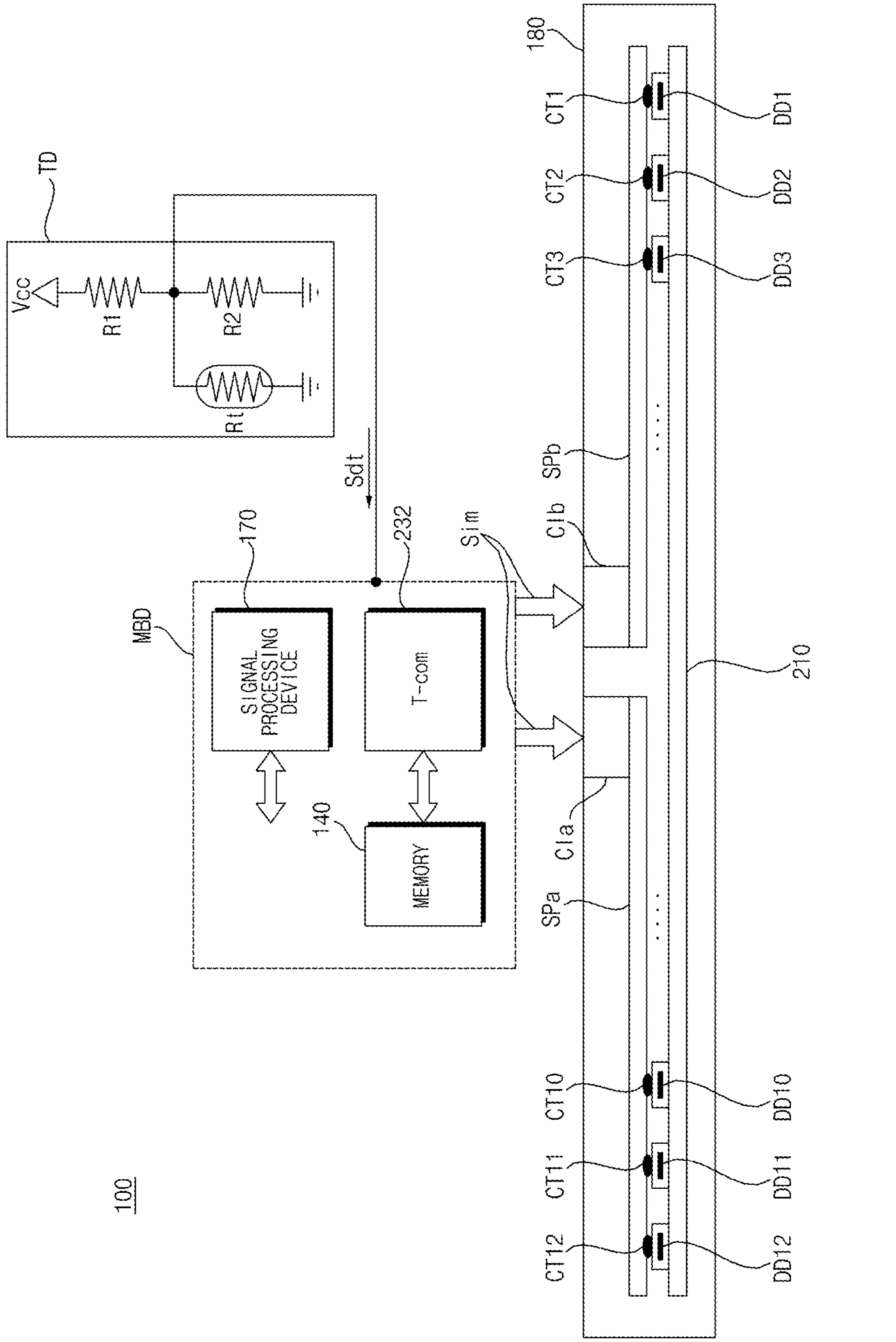
FIG. 10 is an exemplary internal block diagram of an image display apparatus according to an embodiment of the present disclosure.

FIG. 10 illustrates an exemplary internal block diagram of an image display apparatus according to an embodiment of the present disclosure.

Referring to FIG. 10, the image display apparatus 100 according to an embodiment of the present disclosure includes a timing controller 232 configured to output a differential signal Sim, a plurality of data drivers DD1 to DD12 configured to output respective data signals based on the differential signal Sim from the timing controller 232, a panel 210 configured to display an image based on the respective data signal from the plurality of data drivers DD1 to DD12, and a temperature detector TD configured to detect a temperature of or around the panel 210.

The timing controller 232 according to an embodiment of the present disclosure outputs a first differential signal Simaa whose level increases based on a first rising slope SLa when the temperature detected by the temperature detector TD being a first temperature Ta, and outputs a second differential signal Simab whose level increases based on a second rising slope SLb greater than the first rising slope SLa when the temperature detected by the temperature detector TD being a second temperature Tb higher than the first temperature Ta.

Thus, it is possible to reduce panel noise based on a temperature change and electromagnetic noise. In particular, it is possible to reduce panel noise when the temperature around the panel 210 is a high temperature. In addition, it is possible to reduce electromagnetic noise when the temperature around the panel 210 is room temperature.

Here, the first temperature Ta may be 12° C. to 30° C., and the second temperature Tb may be approximately above 40° C.

In other words, the first temperature Ta may be room temperature, and the second temperature Tb may be a high temperature.

Meanwhile, the temperature detector TD according to an embodiment of the present disclosure may include a thermistor Rt whose resistance value changes with temperature.

The temperature detector TD according to the embodiment of the present disclosure may further include a first resistor R1 and a second resistor R2 for distribution of the resistance value of the thermistor Rt.

Referring to the figure, the first resistor R1 may be connected between operating power and one end of the thermistor Rt, and the second resistor R2 may be connected between the one end of the thermistor Rt and a ground terminal.

In other words, the thermistor Rt may be connected between a ground terminal and a node between the first resistor R1 and the second resistor R2.

Meanwhile, a voltage Sdt of the node between the first resistor R1 and the second resistor R2 may be supplied to the timing controller 232 in a main board MBD.

Meanwhile, the timing controller 232, the memory 140, a signal processing device 170 configured to process an input image signal, and the temperature detector TD may be mounted on the main board MBD.

The memory 140 may store each rising slope value of the differential signal according to the temperature detected by the temperature detector TD.

Meanwhile, the memory 140 may store each peak level value of the differential signal according to the temperature detected by the temperature detector TD.

Meanwhile, the memory 140 may store each high level value of the differential signal according to the temperature detected by the temperature detector TD.

The signal processing device 170 and the timing controller 232 may be disposed on the main board MBD, so as to be spaced apart from the plurality of data drivers DD1 to DD12 disposed in the display 180.

Meanwhile, the display 180 according to an embodiment of the present disclosure may include connector interfaces CIa and CIb to receive a differential signal from the timing controller 232 disposed on the main board MBD, circuit boards Spa and Spb electrically connected to the connector interfaces CIa and CIb, the plurality of data drivers DD1 to DD12 mounted on the circuit boards Spa and Spb, and the panel 210 configured to display an image based on data signals output from the plurality of data drivers DD1 to DD12.

Although it is illustrated that the number of data drivers DD1 to DD12 is 12, the present disclosure is not limited thereto. The number of data drivers may vary depending on the resolution of the panel 210, etc.

The plurality of data drivers DD1 to DD12 are electrically connected to respective connecting nodes CT1 to CT12 of the circuit boards SPa and Spb, so as to receive the differential signal from the timing controller 232.

Meanwhile, as the connector interfaces CIa and CIb for receiving a differential signal from the timing controller 232*x* are disposed at the central area of the panel 210, among the plurality of data drivers DD1 to DD12, the data drivers DD1 and DD12 disposed at the opposite end areas Ara and Arb of the panel 210 may be considerably longer in electrical wire length than the data drivers DD6 and DD7 disposed at the central area of the panel 210.

Consequently, when the temperature of or around the panel 210 is high, panel noise such as degradation may be generated at the opposite end portions Ara and Arb of the panel 210, as shown in FIG. 9B.

Meanwhile, an embodiment of the present disclosure provides a method that uses a pre-emphasis period in a differential signal to reduce panel noise even when the temperature of or around the panel 210 is a high temperature.

For example, the timing controller 232 according to an embodiment of the present disclosure may vary the rising slope of the output differential signal according to the temperature detected by the temperature detector TD.

In detail, the timing controller 232 according to the embodiment of the present disclosure outputs a first differential signal Simaa whose level increases based on a first rising slope SLa when the temperature detected by the temperature detector TD being a first temperature Ta, and outputs a second differential signal Simab whose level increases based on a second rising slope greater than the first rising slope SLa when the temperature detected by the temperature detector TD being a second temperature Tb higher than the first temperature Ta.

As such, the higher the temperature, the greater the rising slope of the differential signal, allowing a peak level or high level of the differential signal to be reached more quickly. Thus, although the data drivers DD1 and DD12 disposed at the opposite end portions Ara and Arb of the panel 210 have a long electrical wire length, it is possible to reduce the occurrence of panel noise.

Meanwhile, in an embodiment of the present disclosure, as the rising slope of the differential signal varies according to the temperature, it is possible to reduce electromagnetic noise when the temperature around the panel 210 is room temperature.

Meanwhile, according to an embodiment of the present disclosure, the differential signal output from the timing controller 232 preferably has a pre-emphasis period. This will be described with reference to FIG. 11A and the subsequent figures.

FIGS. 11A to 13 are views referred to in description of FIG. 10.

Figure 11A:
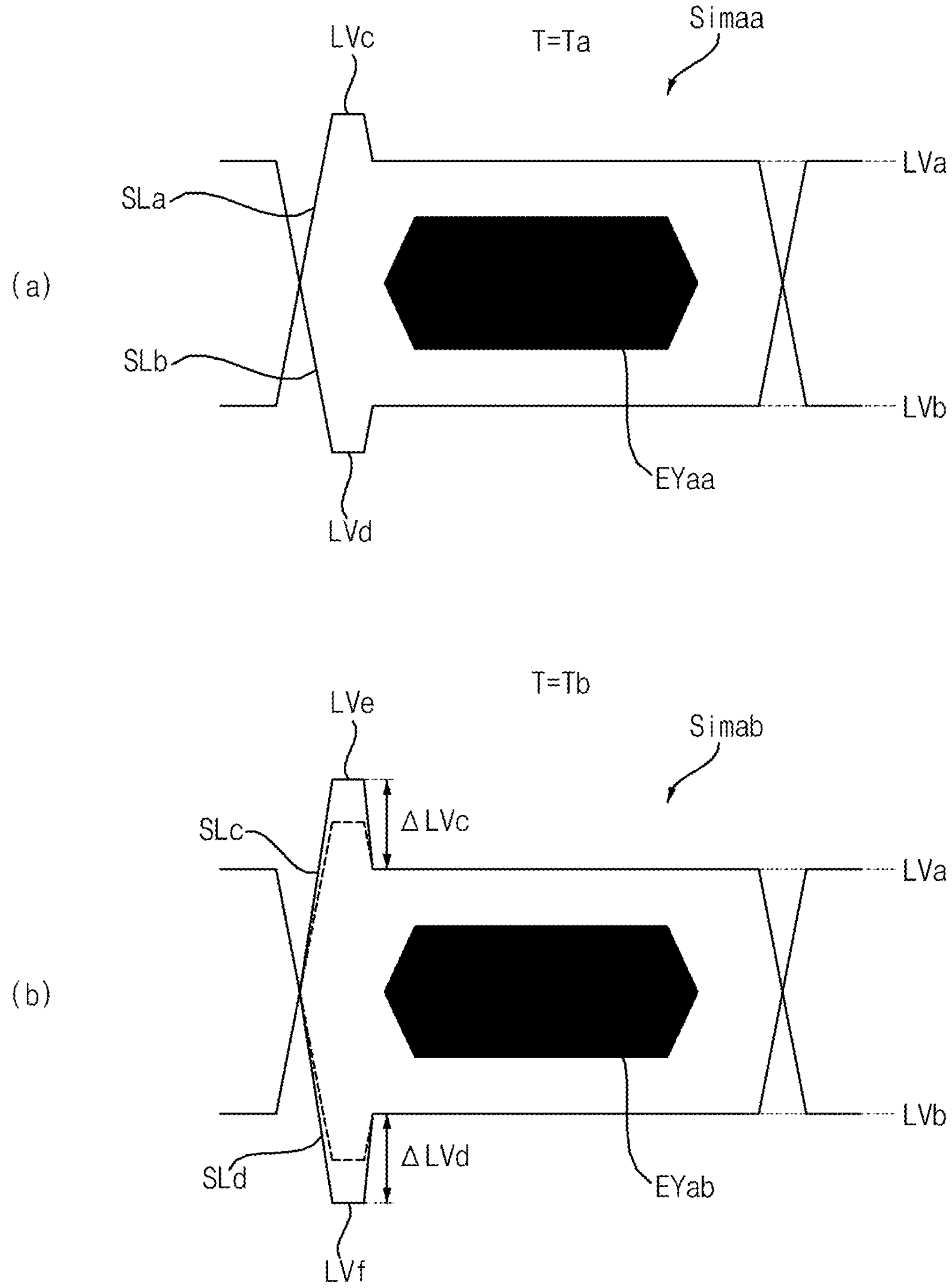
FIGS. 11A to 13 are views referred to in description of FIG. 10.

FIG. 11A illustrates an example of a first differential signal (Simaa) when the temperature detected by the temperature detector TD is the first temperature Ta, and an example of a second differential signal (Simab) when the temperature detected by the temperature detector TD is the second temperature Tb.

Referring to FIG. 11A, the timing controller 232 according to an embodiment of the present disclosure outputs a first differential signal Simaa whose level increases based on a first rising slope SLa and then maintains a first high level LVa when the temperature detected by the temperature detector TD is the first temperature Ta, and outputs a second differential signal Simab whose level increases based on a second rising slope SLb greater than the first rising slope SLa and then maintains the first high level LVa when the temperature detected by the temperature detector TD is the second temperature Tb.

Meanwhile, the plurality of data drivers DD1 to DD12 may each output a data signal based on the first differential signal Simaa with the first rising slope SLa when the temperature detected by the temperature detector TD is the first temperature Ta, and may each output a data signal based on the second differential signal Simab with the second rising slope SLb when the temperature detected by the temperature detector TD is the second temperature Tb.

Meanwhile, as shown in FIG. 11A, the timing controller 232 may output the first differential signal Simaa whose level increases based on a first peak level LVc and the first rising slope SLa when the temperature detected by the temperature detector TD is the first temperature Ta, and may output the second differential signal Simab whose level increases based on a second peak level LVe greater than the first peak level LVc and the second rising slope SLb. Accordingly, it is possible to reduce panel noise based on a temperature change and electromagnetic noise.

Meanwhile, as shown in FIG. 11A, the timing controller 232 may output the first differential signal Simaa whose level increases based on the first peak level LVc and the first rising slope SLa and then maintains the first high level LVa when the temperature detected by the temperature detector TD is the first temperature Ta, and may output the second differential signal Simab whose level increases according to the second peak level LVe greater than the first peak level LVc and the second rising slope SLb and then maintains the first high level LVa when the temperature detected by the temperature detector TD is the second temperature Tb.

In the figure, it is illustrated that when the temperature detected by the temperature detector TD is the first temperature Ta, the first differential signal Simaa rises to the first peak level LVc and then falls to maintain the first high level LVa, and falls to a third peak level LVd and then rises to maintain a first low level LVb.

As shown in the figure, the section where the first peak level LVc or the third peak level LVd is applied may be referred to as a pre-emphasis period.

Meanwhile, in the figure, it is illustrated that the first differential signal Simaa has a difference ΔLVa between the first peak level LVc and the first high level LVa, and a difference ΔLVb between the third peak level LVd and the first low level LVb.

Meanwhile, in an embodiment of the present disclosure, by adjusting the difference ΔLVa between the first peak level LVc and the first high level LVa and the difference ΔLVb between the third peak level LVd and the first low level LVb, it is controlled such that electromagnetic noise is suppressed even when the temperature detected by the temperature detector TD is the first temperature Ta corresponding to room temperature.

That is, the difference ΔLVa between the first peak level LVc and the first high level LVa and the difference ΔLVb between the third peak level LVd and the first low level LVb in the first differential signal Simaa of FIG. 11A should be less than the difference ΔLV1 between the first peak level LV3 and the first high level LV1 and the difference ΔLV2 between the second peak level LV4 and the first low level LV2 in the differential signal Simxc of FIG. 9C.

In the figure, it is illustrated that when the temperature detected by the temperature detector TD is the second temperature Tb, the second differential signal Simab rises to the second peak level LVe greater than the first peak level LVc and then falls to maintain the first high level LVa, and falls to a fourth peak level LVf less than the third peak level LVd and then rises to maintain the first low level LVb.

As shown in the figure, the section where the second peak level LVe or the fourth peak level LVf is applied may be referred to as a pre-emphasis period.

Meanwhile, in the figure, it is illustrated that the second differential signal Simab has a difference ΔLVc between the second peak level LVe and the first high level LVa, and a difference ΔLVd between the fourth peak level LVf and the first low level LVb.

Meanwhile, in an embodiment of the present disclosure, by adjusting the difference ΔLVc between the second peak level LVe and the first high level LVa and the difference ΔLVd between the fourth peak level LVf and the first low level LVb, it is possible to reduce panel noise such as degradation at the opposite end portions Ara and Arb of the panel 210, as shown in FIG. 9, when the temperature detected by the temperature detector TD is the second temperature Tb corresponding to a high temperature.

That is, the difference ΔLVc between the second peak level LVe and the first high level LVa and the difference ΔLVd between the fourth peak level LVf and the first low level LVb in the second differential signal Simab of FIG. 11A should be greater than the difference ΔLV1 between the first peak level LV3 and the first high level LV1 and the difference ΔLV2 between the second peak level LV4 and the first low level LV2 in the differential signal Simxc of FIG. 9C. Thus, even when the temperature of or around the panel 210 is a high temperature of approximately above 40° C., it is possible to suppress panel noise such as degradation at the opposite end portions Ara and Arb of the panel 210, as shown in FIG. 9B.

Therefore, according to FIG. 11A, as the rising slope and the peak level are varied according to whether the temperature detected by the temperature detector TD is room temperature or a high temperature, it is possible to reduce panel noise that may occur at a high temperature and to reduce electromagnetic noise that may occur at room temperature.

Meanwhile, unlike FIG. 11A, the timing controller 232 according to an embodiment of the present disclosure may output a first differential signal whose level increases based on a first peak level LVc and a first rising slope SLa and then maintains a first high level LVa when the temperature detected by the temperature detector TD is the first temperature Ta, and may output a second differential signal whose level increases based on the first peak level LVc and a second rising slope SLb and then maintains the first high level LVa when the temperature detected by the temperature detector TD is the second temperature Tb.

That is, unlike FIG. 11A, when the temperature detected by the temperature detector TD is the second temperature Tb, the peak level may be the first peak level LVc rather than the second peak level LVe.

When the temperature detected by the temperature detector TD is the second temperature Tb, as the level increases based on the first peak level LVc and the second rising slope SLb and then maintains the first high level LVa, it is possible to reduce panel noise that may occur at a high temperature.

Figure 11B:
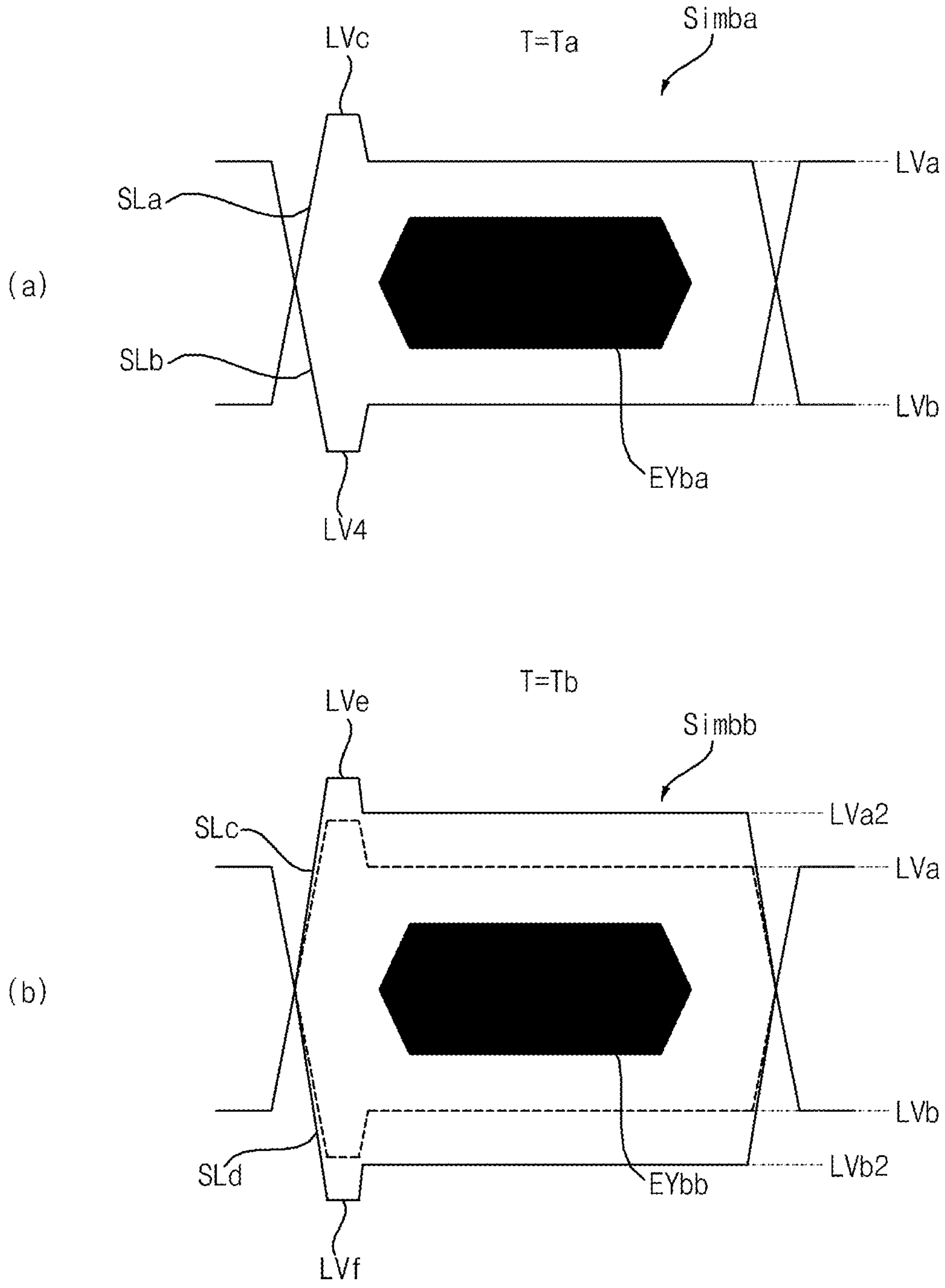

Next, FIG. 11B illustrates another example of a first differential signal (Simba) when the temperature detected by the temperature detector TD is the first temperature Ta, and another example of a second differential signal (Simbb) when the temperature detected by the temperature detector TD is the second temperature Tb.

Referring to FIG. 11B, the timing controller 232 according to an embodiment of the present disclosure may output a first differential signal Simba whose level increases based on a first rising slope SLa and then maintains a first high level LVa when the temperature detected by the temperature detector TD is the first temperature Ta, and may output a second differential signal Simbb whose level increases based on a second rising slope SLb and then maintains a second high level LVa2 higher than the first high level LVa when the temperature detected by the temperature detector TD is the second temperature Tb.

As the high level varies according to the temperature, it is possible to reduce panel noise based on a temperature change and electromagnetic noise.

Meanwhile, the timing controller 232 according to the embodiment of the present disclosure may output the first differential signal Simba whose level increases based on a first peak level LVc and the first rising slope SLa and then maintains the first high level LVa when the temperature detected by the temperature detector TD is the first temperature Ta, and may output the second differential signal Simbb whose level increases based on a second peak level LVe greater than the first peak level LVc and the second rising slope SLb and then maintains the second high level LVa2 higher than the first high level LVa when the temperature detected by the temperature detector TD is the second temperature Tb. Accordingly, it is possible to reduce panel noise based on a temperature change and electromagnetic noise.

Meanwhile, unlike FIG. 11B, the same peak level may be applied to both cases when the temperature detected by the temperature detector TD is the first temperature Ta and when the temperature detected by the temperature detector TD is the second temperature Tb.

For example, the timing controller 232 according to an embodiment of the present disclosure may output a first differential signal Simba whose level increases based on a first peak level LVc and a first rising slope SLa and then maintains a first high level LVa when the temperature detected by the temperature detector TD is the first temperature Ta, and may output a second differential signal Simbb whose level increases based on the first peak level LVc and a second rising slope SLb and then maintains a second high level LVa2 higher than the first high level LVa when the temperature detected by the temperature detector TD is the second temperature Tb.

That is, unlike FIG. 11B, when the temperature detected by the temperature detector TD is the second temperature Tb, the peak level may be the first peak level LVc rather than the second peak level LVe.

Meanwhile, unlike FIGS. 11A and 11B, the timing controller 232 may output a first differential signal Simaa whose level increases based on a first rising slope SLa when the temperature detected by the temperature detector TD is the first temperature Ta that is less than or equal to a first reference temperature, and may output a second differential signal Simba whose level increases based on a second rising slope SLb greater than the first rising slope SLa when the temperature detected by the temperature detector TD is the second temperature Tb that is greater than or equal to a second reference temperature higher than the first reference temperature. Accordingly, it is possible to reduce panel noise based on a temperature change and electromagnetic noise.

In this case, the first reference temperature may be approximately 30° C. or 35° C., and the second reference temperature may be approximately 40° C.

Alternatively, the first reference temperature and the second reference temperature may be the same, which may be approximately 35° C.

Meanwhile, unlike FIGS. 11A and 11B, when the temperature detected by the temperature detector TD is greater than or equal to the second reference temperature, the timing controller 232 according to an embodiment of the present disclosure may output a second differential signal Simba having a rising slope which increases as the detected temperature increases.

For example, when the temperature detected by the temperature detector TD is greater than or equal to the second reference temperature and is a third temperature higher than the second temperature Tb, the timing controller 232 may output a differential signal whose level increases according to a third rising slope greater than the second rising slope SLb. Accordingly, it is possible to reduce panel noise based on a temperature change, etc.

Meanwhile, when the temperature detected by the temperature detector TD is greater than or equal to the second reference temperature and is the third temperature higher than the second temperature Tb, the peak level may be a peak level that is greater than the second peak level LVe. Accordingly, it is possible to reduce panel noise based on a temperature change, etc.

Meanwhile, unlike FIGS. 11A and 11B, when the temperature detected by the temperature detector TD is greater than or equal to the second reference temperature, the timing controller 232 according to an embodiment of the present disclosure may output a second differential signal Simba having a swing level which increases as the detected temperature increases.

In this case, the swing level may refer to a level difference between the first high level LVa and the first low level LVb.

That is, when the temperature detected by the temperature detector TD is greater than or equal to the second reference temperature, the timing controller 232 according to the embodiment of the present disclosure may control such that the high level increases and the low level decreases as the detected temperature increases, thereby controlling a swing level between the high level and the low level to increase. Accordingly, it is possible to reduce panel noise based on a temperature change, etc.

Meanwhile, the timing controller 232 according to an embodiment of the present disclosure may output a differential signal Sim having a rising slope which increases as the temperature detected by the temperature detector TD increases.

For example, when the temperature detected by the temperature detector TD is a third temperature between the first temperature Ta and the second temperature Tb, the timing controller 232 according to an embodiment of the present disclosure may output a differential signal with a rising slope between the first rising slope SLa and the second rising slope SLb. Accordingly, it is possible to reduce panel noise based on a temperature change, etc.

Meanwhile, the timing controller 232 according to an embodiment of the present disclosure may output a differential signal Sim having a swing level which increases as the temperature detected by the temperature detector TD increases.

For example, when the temperature detected by the temperature detector TD is a third temperature between the first temperature Ta and the second temperature Tb, the timing controller 232 according to an embodiment of the present disclosure may output a differential signal with a high level between the first high level LVa and the second high level LVa2. Accordingly, it is possible to reduce panel noise based on a temperature change, etc.

Meanwhile, the timing controller 232 according to an embodiment of the present disclosure may output a differential signal Sim having a peak level which increases as the temperature detected by the temperature detector TD increases.

For example, when the temperature detected by the temperature detector TD is a third temperature between the first temperature Ta and the second temperature Tb, the timing controller 232 according to an embodiment of the present disclosure may output a differential signal with a peak level between the first peak level LVc and the second peak level LVe. Accordingly, it is possible to reduce panel noise based on a temperature change, etc.

Meanwhile, unlike FIGS. 11A and 11B, the timing controller 232 may control the rising slope to be constant (same), despite a change in temperature, while controlling the peak level or high level to be varied. This will be described with reference to FIGS. 11C and 11D.

Figure 11C:
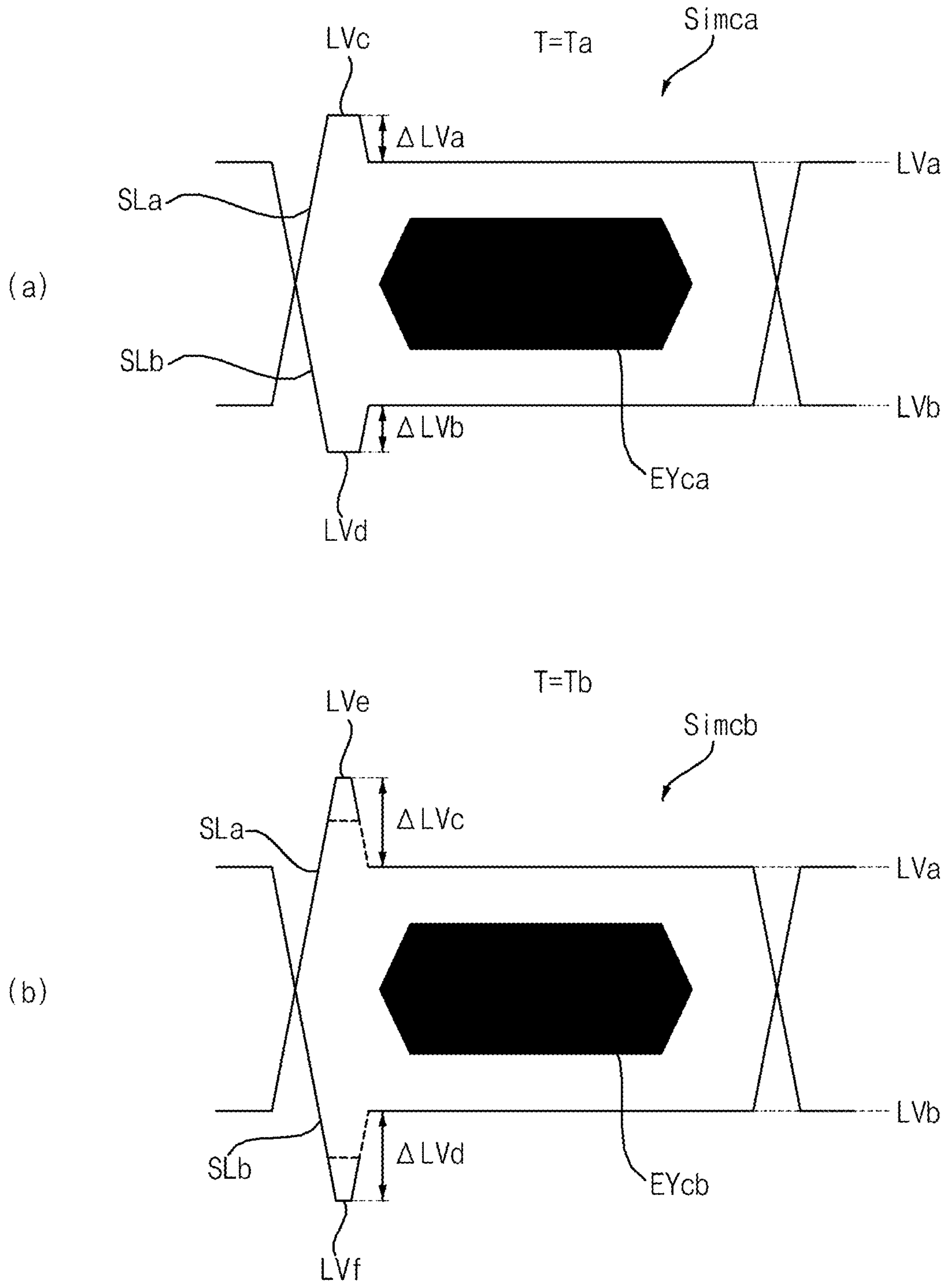

FIG. 11C illustrates yet another example of a first differential signal (Simca) when the temperature detected by the temperature detector TD is the first temperature Ta and yet another example of a second differential signal (Simcb) when the temperature detected by the temperature detector TD is the second temperature Tb.

Referring to FIG. 11C, the timing controller 232 according to another embodiment of the present disclosure outputs a first differential signal Simca whose level increases based on a first peak level LVc when the temperature detected by the temperature detector TD is the first temperature Ta, and outputs a second differential signal Simcb whose level increases based on a second peak level LVe greater than the first peak level LVc when the temperature detected by the temperature detector TD is the second temperature Tb. Thus, it is possible to reduce panel noise based on a temperature change and electromagnetic noise. In particular, it is possible to reduce panel noise when the temperature around the panel 210 is a high temperature. In addition, it is possible to reduce electromagnetic noise when the temperature around the panel 210 is room temperature.

In detail, the timing controller 232 according to another embodiment of the present disclosure outputs the first differential signal Simca whose level increases based on the first peak level LVc and then maintains a first high level LVa when the temperature detected by the temperature detector TD is the first temperature Ta, and outputs the second differential signal Simcb whose level increases according to the second peak level LVe greater than the first peak level LVc and then maintains the first high level LVa when the temperature detected by the temperature detector TD is the second temperature Tb. Accordingly, it is possible to reduce panel noise based on a temperature change and electromagnetic noise.

In the figure, it is illustrated that when the temperature detected by the temperature detector TD is the first temperature Ta, the first differential signal Simca rises to the first peak level LVc and then falls to maintain the first high level LVa, and falls to a third peak level LVd and then rises to maintain a first low level LVb.

As shown in the figure, the section where the first peak level LVc or the third peak level LVd is applied may be referred to as a pre-emphasis period.

Meanwhile, in the figure, it is illustrated that the first differential signal Simca has a difference ΔLVa between the first peak level LVc and the first high level LVa, and a difference ΔLVb between the third peak level LVd and the first low level LVb.

Meanwhile, the first differential signal Simca and the second differential signal Simcb may have the same rising slope.

Meanwhile, when the temperature detected by the temperature detector TD is the first temperature Ta that is less than or equal to a first reference temperature, the timing controller 232 may output the first differential signal Simaa whose level increases based on the first peak level LVc, and may output the second differential signal Simba whose level increases according to the second peak level LVe when the temperature detected by the temperature detector TD is the second temperature Tb that is greater than or equal to a second reference temperature higher than the first reference temperature. Accordingly, it is possible to reduce panel noise based on a temperature change and electromagnetic noise.

Figure 11D:
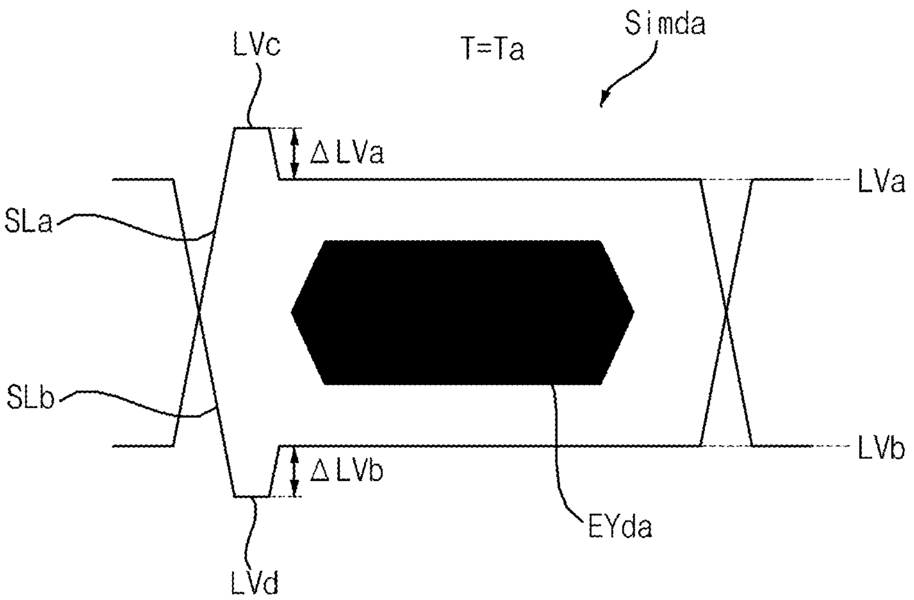
Figure 11D:
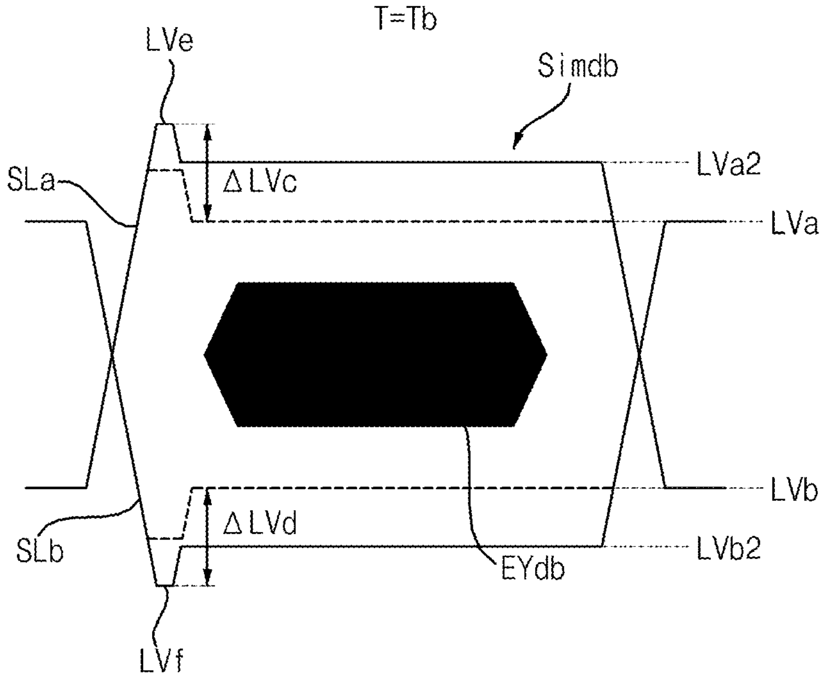

FIG. 11D illustrates yet another example of a first differential signal (Simda) when the temperature detected by the temperature detector TD is the first temperature Ta, and yet another example of a second differential signal (Simdb) when the temperature detected by the temperature detector TD is the second temperature Tb.

Referring to FIG. 11D, the timing controller 232 according to yet another embodiment of the present disclosure may output a first differential signal Simda whose level increases based on a first peak level LVc and then maintains a first high level LVa when the temperature detected by the temperature detector TD is the first temperature Ta, and may output a second differential signal Simdb whose level increases based on the first peak level LVc and then maintains a second high level LVa2 higher than the first high level LVa when the temperature detected by the temperature detector TD is the second temperature Tb. Accordingly, it is possible to reduce panel noise based on a temperature change and electromagnetic noise.

Meanwhile, unlike FIGS. 11C and 11D, the timing controller 232 may output a differential signal Sim having a peak level which increases as the temperature detected by the temperature detector TD increases. Accordingly, it is possible to reduce panel noise based on a temperature change and electromagnetic noise.

Figure 12:
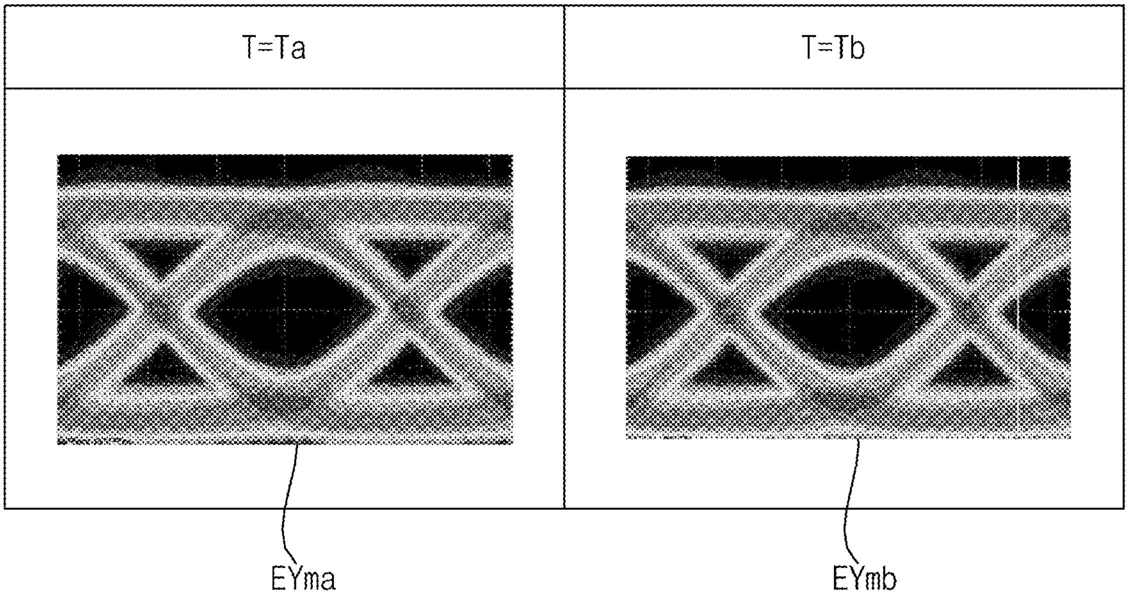

FIG. 12 illustrates an eye diagram obtained from the first differential signal Simaa and the second differential signal Simab of FIG. 11A.

Referring to FIG. 12, when the first differential signal Simaa of (a) of FIG. 11A is output while the temperature of or around the panel 210 is the first temperature Ta corresponding to room temperature, an eye diagram Eyma like (a) of FIG. 12 may be measured.

It can be seen from (a) of FIG. 12 that, despite the first peak level in the pre-emphasis period, the shape of an eye in the eye diagram Eyma is not distorted and exhibits a normal shape.

Meanwhile, when the second differential signal Simab of (b) of FIG. 11A is output while the temperature of or around the panel 210 is the second temperature Tb corresponding to a high temperature, an eye diagram Eymb like (b) of FIG. 12 may be measured.

It can be seen from (b) of FIG. 12 that, despite the second peak level in the pre-emphasis period, the shape of an eye in the eye diagram Eyxb is represented as normal (undistorted).

Therefore, according to an embodiment of the present disclosure, it is possible to reduce panel noise based on a temperature change and electromagnetic noise. In particular, it is possible to reduce panel noise when the temperature around the panel 210 is a high temperature. In addition, it is possible to reduce electromagnetic noise when the temperature around the panel 210 is room temperature.

Figure 13:
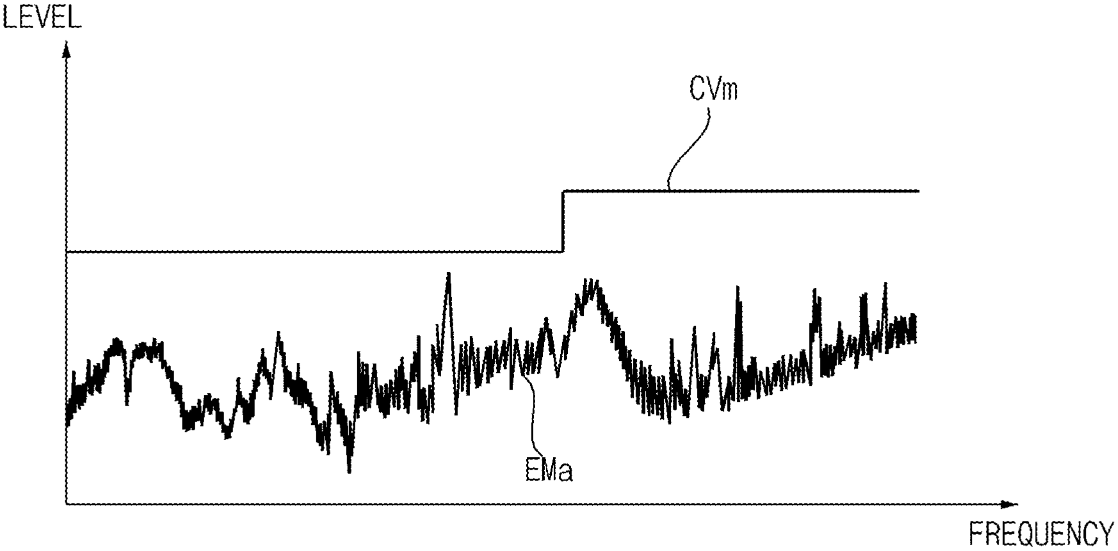

FIG. 13 illustrates an example of electromagnetic noise caused by the first differential signal Simaa of (a) of FIG. 11A.

Referring to FIG. 13, electromagnetic noise EMa is generated due to the first differential signal Simaa like (a) of FIG. 11A, and in particular, compared to an electromagnetic margin curve Cvm, electromagnetic noise is reduced in the high frequency region as well as the low frequency region.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. An image display apparatus comprising:

a timing controller configured to output a differential signal;

a plurality of data drivers configured to output a respective data signal based on the differential signal from the timing controller;

a panel configured to output an image based on the respective data signal from the plurality of data drivers; and a temperature detector configured to detect a temperature of or around the panel, wherein the timing controller is configured to:

in response to the temperature detected by the temperature detector being a first temperature, output a first differential signal whose level increases based on a first rising slope; and in response to the temperature detected by the temperature detector being a second temperature higher than the first temperature, output a second differential signal whose level increases based on a second rising slope greater than the first rising slope.

2. The image display apparatus of claim 1, wherein the timing controller is configured to:

in response to the temperature detected by the temperature detector being the first temperature, output the first differential signal whose level increases based on the first rising slope and then maintains a first high level; and in response to the temperature detected by the temperature detector being the second temperature, output the second differential signal whose level increases based on the second rising slope and then maintains the first high level.

3. The image display apparatus of claim 1, wherein the timing controller is configured to:

in response to the temperature detected by the temperature detector being the first temperature, output the first differential signal whose level increases based on the first rising slope and then maintains a first high level; and in response to the temperature detected by the temperature detector being the second temperature, output the second differential signal whose level increases based on the second rising slope and then maintains a second high level higher than the first high level.

4. The image display apparatus of claim 1, wherein the timing controller is configured to:

in response to the temperature detected by the temperature detector being the first temperature, output the first differential signal whose level increases based on a first peak level and the first rising slope; and in response to the temperature detected by the temperature detector being the second temperature, output the second differential signal whose level increases based on a second peak level greater than the first peak level and the second rising slope.

5. The image display apparatus of claim 1, wherein the timing controller is configured to:

in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on a second peak level greater than the first peak level and the second rising slope and then maintains the first high level.

6. The image display apparatus of claim 1, wherein the timing controller is configured to:

in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on a second peak level greater than the first peak level and the second rising slope and then maintains a second high level higher than the first high level.

7. The image display apparatus of claim 1, wherein the timing controller is configured to:

in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on the first peak level and the second rising slope and then maintains the first high level.

8. The image display apparatus of claim 1, wherein the timing controller is configured to:

in response to the temperature detected by the temperature detector being the first temperature, output the first differential signal whose level increases based on a first peak level and the first rising slope and then maintains a first high level; and in response to the temperature detected by the temperature detector being the second temperature, output the second differential signal whose level increases based on the first peak level and the second rising slope and then maintains a second high level higher than the first high level.

9. The image display apparatus of claim 1, wherein the timing controller is configured to:

in response to the temperature detected by the temperature detector being the first temperature less than or equal to a first reference temperature, output the first differential signal whose level increases based on a first rising slope; and in response to the temperature detected by the temperature detector being the second temperature greater than or equal to a second reference temperature higher than the first reference temperature, output the second differential signal whose level increases based on a second rising slope greater than the first rising slope.

10. The image display apparatus of claim 9, wherein, in response to the temperature detected by the temperature detector being greater than or equal to the second reference temperature, the timing controller is configured to output the second differential signal having a rising slope which increases as the detected temperature increases.

11. The image display apparatus of claim 9, wherein, in response to the temperature detected by the temperature detector being greater than or equal to the second reference temperature, the timing controller is configured to output the second differential signal having a swing level which increases as the detected temperature increases.

12. The image display apparatus of claim 1, wherein the timing controller is configured to output a differential signal having a rising slope which increases as the temperature detected by the temperature detector increases.

13. The image display apparatus of claim 1, wherein the timing controller is configured to output a differential signal having a swing level which increases as the temperature detected by the temperature detector increases.

14. The image display apparatus of claim 1, wherein the plurality of data drivers are configured to:

in response to the temperature detected by the temperature detector being the first temperature, output respective data signals based on the first differential signal having the first rising slope; and in response to the temperature detected by the temperature detector being the second temperature, output respective data signals based on the second differential signal having the second rising slope.

15. The image display apparatus of claim 1, further comprising a signal processing device configured to process an input image signal, wherein the signal processing device and the timing controller are disposed on a main board, and spaced apart from the plurality of data drivers.

16. An image display apparatus comprising:

a timing controller configured to output a differential signal;

a plurality of data drivers configured to output a respective data signal based on the differential signal from the timing controller;

a panel configured to output an image based on the respective data signal from the plurality of data drivers; and a temperature detector configured to detect a temperature of or around the panel, wherein the timing controller is configured to:

in response to the temperature detected by the temperature detector being a first temperature, output a first differential signal whose level increases based on a first peak level; and in response to the temperature detected by the temperature detector being a second temperature, output a second differential signal whose level increases based on a second peak level greater than the first peak level.

17. The image display apparatus of claim 16, wherein the timing controller is configured to:

in response to the temperature detected by the temperature detector being the first temperature, output the first differential signal whose level increases based on the first peak level and then maintains a first high level; and in response to the temperature detected by the temperature detector being the second temperature, output the second differential signal whose level increases based on the first peak level and then maintains the first high level.

18. The image display apparatus of claim 16, wherein the timing controller is configured to:

in response to the temperature detected by the temperature detector being the first temperature, output the first differential signal whose level increases based on the first peak level and then maintains a first high level; and in response to the temperature detected by the temperature detector being the second temperature, output the second differential signal whose level increases based on the first peak level and then maintains a second high level higher than the first high level.

19. The image display apparatus of claim 16, wherein the timing controller is configured to:

in response to the temperature detected by the temperature detector being the first temperature less than or equal to a first reference temperature, output the first differential signal whose level increases based on the first peak level; and in response to the temperature detected by the temperature detector being the second temperature greater than or equal to a second reference temperature higher than the first reference temperature, output the second differential signal whose level increases according to the second peak level.

20. The image display apparatus of claim 16, wherein the timing controller is configured to output a differential signal having a peak level which increases as the temperature detected by the temperature detector increases.

* * * * *